US010255526B2

(12) United States Patent
Gandenberger

(10) Patent No.: US 10,255,526 B2
(45) Date of Patent: Apr. 9, 2019

(54) COMPUTER SYSTEM AND METHOD FOR CLASSIFYING TEMPORAL PATTERNS OF CHANGE IN IMAGES OF AN AREA

(71) Applicant: Uptake Technologies, Inc., Chicago, IL (US)

(72) Inventor: Greg Gandenberger, Mt. Prospect, IL (US)

(73) Assignee: Uptake Technologies, Inc., Chicago, IL (US)

( * ) Notice: Subject to any disclaimer, the term of this patent is extended or adjusted under 35 U.S.C. 154(b) by 10 days.

(21) Appl. No.: 15/618,400

(22) Filed: Jun. 9, 2017

(65) Prior Publication Data

US 2018/0357517 A1 Dec. 13, 2018

(51) Int. Cl.
*G06K 9/00* (2006.01)
*G06K 9/62* (2006.01)
(Continued)

(52) U.S. Cl.
CPC ......... *G06K 9/6268* (2013.01); *G06K 9/4642* (2013.01); *H04L 67/10* (2013.01);
(Continued)

(58) Field of Classification Search
CPC .. G06K 9/6407; G06K 9/2009; G06K 9/6423; G06T 7/001; G06F 17/30249
See application file for complete search history.

(56) References Cited

U.S. PATENT DOCUMENTS 4,912,770 A 3/1990 Seto et al.
5,566,092 A 10/1996 Wang et al.
(Continued)

FOREIGN PATENT DOCUMENTS

WO 2006113582 A2 10/2006
WO 2011117570 9/2011
(Continued)

OTHER PUBLICATIONS

Biswas, "Redundancy-based Approaches in Wireless Multihop Network Design", PhD Dissertation Submitted to Graduate Faculty of North Carolina State University (2014).
(Continued)

*Primary Examiner* — Amir Alavi
(74) *Attorney, Agent, or Firm* — Lee Sullivan Shea & Smith LLP

(57) ABSTRACT

A set of successive images for a given area may comprise a first, second, and third images representing different times. Comparisons may be performed between the first image and the second image, the first image and the third image, and the second image and the third image. The respective outputs of the three pairwise comparisons may be evaluated to identify any sub-areas of the given area where one or more temporal patterns of change have occurred. For instance, any sub-area of the given area that exhibits a change between the first and second images, a change between the second and third images, and an absence of change between the second and third images may be identified as a persistent change. An indication that the temporal pattern of change has occurred at each identified sub-area of the given area may then be output to a client station.

20 Claims, 8 Drawing Sheets

(51) Int. Cl.
*G06K 9/46* (2006.01)
*H04L 29/08* (2006.01)

(52) U.S. Cl.
CPC ............... *G06K 9/00711* (2013.01); *G06K 2009/00738* (2013.01)

(56) References Cited

U.S. PATENT DOCUMENTS

| | | |
|---|---|---|
| 5,633,800 A | 5/1997 | Bankert et al. |
| 5,719,949 A | 2/1998 | Koeln et al. |
| 6,256,594 B1 | 7/2001 | Yamamoto et al. |
| 6,336,065 B1 | 1/2002 | Gibson et al. |
| 6,442,542 B1 | 8/2002 | Ramani et al. |
| 6,473,659 B1 | 10/2002 | Shah et al. |
| 6,622,264 B1 | 9/2003 | Bliley et al. |
| 6,634,000 B1 | 10/2003 | Jammu et al. |
| 6,643,600 B2 | 11/2003 | Yanosik et al. |
| 6,650,949 B1 | 11/2003 | Fera et al. |
| 6,725,398 B1 | 4/2004 | Varma et al. |
| 6,760,631 B1 | 7/2004 | Berkowitz et al. |
| 6,775,641 B2 | 8/2004 | Wegerich et al. |
| 6,799,154 B1 | 9/2004 | Aragones et al. |
| 6,823,253 B2 | 11/2004 | Brunell |
| 6,859,739 B2 | 2/2005 | Wegerich et al. |
| 6,892,163 B1 | 5/2005 | Herzog et al. |
| 6,947,797 B2 | 9/2005 | Dean et al. |
| 6,952,662 B2 | 10/2005 | Wegerich et al. |
| 6,957,172 B2 | 10/2005 | Wegerich |
| 6,975,962 B2 | 12/2005 | Wegerich et al. |
| 7,020,595 B1 | 3/2006 | Adibhatla et al. |
| 7,082,379 B1 | 7/2006 | Bickford et al. |
| 7,100,084 B2 | 8/2006 | Unkle et al. |
| 7,107,491 B2 | 9/2006 | Graichen et al. |
| 7,127,371 B2 | 10/2006 | Duckert et al. |
| 7,233,886 B2 | 6/2007 | Wegerich et al. |
| 7,280,941 B2 | 10/2007 | Bonanni et al. |
| 7,308,385 B2 | 12/2007 | Wegerich et al. |
| 7,373,283 B2 | 5/2008 | Herzog et al. |
| 7,400,770 B2 | 7/2008 | Keaton et al. |
| 7,403,869 B2 | 7/2008 | Wegerich et al. |
| 7,409,320 B2 | 8/2008 | Wegerich |
| 7,415,382 B1 | 8/2008 | Bickford et al. |
| 7,428,478 B2 | 9/2008 | Aragones |
| 7,447,666 B2 | 11/2008 | Wang |
| 7,457,693 B2 | 11/2008 | Olsen et al. |
| 7,457,732 B2 | 11/2008 | Aragones et al. |
| 7,509,235 B2 | 3/2009 | Bonissone et al. |
| 7,536,364 B2 | 5/2009 | Subbu et al. |
| 7,539,597 B2 | 5/2009 | Wegerich et al. |
| 7,548,830 B2 | 6/2009 | Goebel et al. |
| 7,596,242 B2 | 9/2009 | Breed et al. |
| 7,634,384 B2 | 12/2009 | Eryurek et al. |
| 7,640,145 B2 | 12/2009 | Wegerich et al. |
| 7,660,705 B1 | 2/2010 | Meek et al. |
| 7,679,530 B2 | 3/2010 | Waquet |
| 7,725,293 B2 | 5/2010 | Bonissone et al. |
| 7,739,096 B2 | 6/2010 | Wegerich et al. |
| 7,756,678 B2 | 7/2010 | Bonissone et al. |
| 7,822,578 B2 | 10/2010 | Kasztenny et al. |
| 7,869,908 B2 | 1/2011 | Walker |
| 7,919,940 B2 | 4/2011 | Miller et al. |
| 7,941,701 B2 | 5/2011 | Wegerich et al. |
| 7,962,240 B2 | 6/2011 | Morrison et al. |
| 8,024,069 B2 | 9/2011 | Miller et al. |
| 8,050,800 B2 | 11/2011 | Miller et al. |
| 8,145,578 B2 | 3/2012 | Pershing et al. |
| 8,229,769 B1 | 7/2012 | Hopkins |
| 8,234,420 B2 | 7/2012 | Lueckenbach et al. |
| 8,239,170 B2 | 8/2012 | Wegerich |
| 8,275,577 B2 | 9/2012 | Herzog |
| 8,285,402 B2 | 10/2012 | Lueckenbach et al. |
| 8,311,774 B2 | 11/2012 | Hines |
| 8,352,216 B2 | 1/2013 | Subbu et al. |
| 8,532,795 B2 | 9/2013 | Adavi et al. |
| 8,533,018 B2 | 9/2013 | Miwa et al. |
| 8,560,494 B1 | 10/2013 | Downing et al. |
| 8,620,618 B2 | 12/2013 | Eryurek et al. |
| 8,620,853 B2 | 12/2013 | Herzog |
| 8,626,385 B2 | 1/2014 | Humphrey |
| 8,645,276 B2 | 2/2014 | Wong et al. |
| 8,660,980 B2 | 2/2014 | Herzog |
| 8,689,108 B1 | 4/2014 | Duffield et al. |
| 8,713,467 B1 | 4/2014 | Goldenberg et al. |
| 8,786,605 B1 | 7/2014 | Curtis et al. |
| 8,799,799 B1 | 8/2014 | Cervelli et al. |
| 8,812,960 B1 | 8/2014 | Sun et al. |
| 8,832,594 B1 | 9/2014 | Thompson et al. |
| 8,850,000 B2 | 9/2014 | Collins et al. |
| 8,862,938 B2 | 10/2014 | Souvannarath |
| 8,868,537 B1 | 10/2014 | Colgrove et al. |
| 8,886,601 B1 | 11/2014 | Landau et al. |
| 8,909,656 B2 | 12/2014 | Kumar et al. |
| 8,917,274 B2 | 12/2014 | Ma et al. |
| 8,918,246 B2 | 12/2014 | Friend |
| 8,924,429 B1 | 12/2014 | Fisher et al. |
| 8,935,201 B1 | 1/2015 | Fisher et al. |
| 8,937,619 B2 | 1/2015 | Sharma et al. |
| 8,938,686 B1 | 1/2015 | Erenrich et al. |
| 2002/0091972 A1 | 7/2002 | Harris et al. |
| 2002/0152056 A1 | 10/2002 | Herzog et al. |
| 2003/0055666 A1 | 3/2003 | Roddy et al. |
| 2003/0126258 A1 | 7/2003 | Conkright et al. |
| 2003/0228058 A1 | 12/2003 | Xie et al. |
| 2004/0181712 A1 | 9/2004 | Taniguchi et al. |
| 2004/0243636 A1 | 12/2004 | Hasiewicz et al. |
| 2005/0119905 A1 | 6/2005 | Wong et al. |
| 2005/0222747 A1 | 10/2005 | Vhora et al. |
| 2006/0044444 A1* | 3/2006 | Okamoto ............... H04N 5/232 348/333.05 |
| 2006/0228019 A1 | 10/2006 | Rahmes et al. |
| 2007/0003117 A1* | 1/2007 | Wheeler ................ G06T 7/001 382/128 |
| 2007/0226004 A1 | 9/2007 | Harrison |
| 2007/0263628 A1 | 11/2007 | Axelsson et al. |
| 2008/0059080 A1 | 3/2008 | Greiner et al. |
| 2008/0059120 A1 | 3/2008 | Xiao et al. |
| 2008/0140271 A1 | 6/2008 | Garceau et al. |
| 2008/0181492 A1* | 7/2008 | Abe ...................... H04N 19/14 382/165 |
| 2009/0324026 A1 | 12/2009 | Kletter |
| 2010/0098342 A1 | 4/2010 | Davis et al. |
| 2010/0100835 A1 | 4/2010 | Klaric et al. |
| 2012/0082343 A1 | 4/2012 | Schoeberl et al. |
| 2012/0237083 A1 | 9/2012 | Lange et al. |
| 2012/0271612 A1 | 10/2012 | Barsoum et al. |
| 2012/0310597 A1 | 12/2012 | Uchiyama et al. |
| 2013/0010610 A1 | 1/2013 | Karthikeyan et al. |
| 2013/0024416 A1 | 1/2013 | Herzog |
| 2013/0283773 A1 | 10/2013 | Hague |
| 2013/0325502 A1 | 12/2013 | Robicsek et al. |
| 2014/0012886 A1 | 1/2014 | Downing et al. |
| 2014/0032132 A1 | 1/2014 | Stratton et al. |
| 2014/0060030 A1 | 3/2014 | Ma et al. |
| 2014/0089035 A1 | 3/2014 | Jericho et al. |
| 2014/0105481 A1 | 4/2014 | Hasselbusch et al. |
| 2014/0121868 A1 | 5/2014 | Zhang et al. |
| 2014/0146330 A1* | 5/2014 | Miyata ................ G06F 3/1205 358/1.9 |
| 2014/0169398 A1 | 6/2014 | Arndt et al. |
| 2014/0170617 A1 | 6/2014 | Johnson et al. |
| 2014/0184643 A1 | 7/2014 | Friend |
| 2014/0222355 A1 | 8/2014 | Cheim et al. |
| 2014/0324836 A1* | 10/2014 | Chittar ............... G06F 17/3025 707/722 |
| 2014/0330600 A1 | 11/2014 | Candas et al. |
| 2014/0330749 A1 | 11/2014 | Candas et al. |
| 2014/0351642 A1 | 11/2014 | Bates et al. |
| 2014/0357295 A1 | 12/2014 | Skomra et al. |
| 2014/0358601 A1 | 12/2014 | Smiley et al. |
| 2015/0046870 A1 | 2/2015 | Goldenberg et al. |
| 2015/0254499 A1* | 9/2015 | Pang ................... G06K 9/00208 382/103 |
| 2015/0262060 A1 | 9/2015 | Husain et al. |
| 2017/0061217 A1 | 3/2017 | Cha et al. |

(56) References Cited

U.S. PATENT DOCUMENTS

| | | | | |
|---|---|---|---|---|
| 2017/0147901 A1* | 5/2017 | Klein | ................... | G06K 9/6202 |
| 2017/0358069 A1* | 12/2017 | Sagisaka | ............ | G01N 21/8851 |
| 2018/0107460 A1* | 4/2018 | Takata | ...................... | G06F 8/34 |

FOREIGN PATENT DOCUMENTS

| | | |
|---|---|---|
| WO | 2013034420 | 3/2013 |
| WO | 2014145977 | 9/2014 |
| WO | 2014205497 | 12/2014 |

OTHER PUBLICATIONS

Isermann, "Model-based Fault Detection and Diagnosis—Status and Applications", Institute of Automatic Control, Darmstadt University of Technology (2004).

Narasimhan et al, "Combining Model-Based and Feature-Driven Diagnosis Approaches—A Case Study on Electromechanical Actuators", 21st International Workshop on Principles of Diagnosis (2010).

Prentzas et al, Categorizing Approaches Combining Rule-Based and Case-Based Reasoning.

Infor M3 Enterprise Management System, Infor.com (2014).

Infor Equipment, Infor.com (2012).

Infor Introduces Next-Generation Solution for Equipment Dealers and Service Providers, Infor.com (Feb. 20, 2014).

Infor Equipment for Rental, Infor.com (2013).

Waltermire et al, Applying the Continuous Monitoring Technical Reference Model to the Asset, Configuration, and Vulnerability Management Domains (DRAFT), NIST (Jan. 2012).

International Searching Authority, International Search Report and Written Opinion dated Sep. 28, 2018, issued in connection with International Application No. PCT/US2018/036459, filed on Jun. 7, 2018, 13 pages.

* cited by examiner

COMPUTER SYSTEM AND METHOD FOR CLASSIFYING TEMPORAL PATTERNS OF CHANGE IN IMAGES OF AN AREA

BACKGROUND

As time passes, a geographical area or the like may experience various types of changes, such as man-made changes and/or naturally occurring changes. Examples of a man-made change may include construction of structure (e.g., a building, a road, a natural gas pad, etc.), digging of pits, trenches, etc., and/or destruction of previously-existing features of the area (e.g., razing a structure, deforestation of land for farming, etc.). Examples of a naturally occurring change may include formation of a landform (e.g., a volcano, a cliff, a river, etc.), growth of vegetation, and/or erosion of land.

For various reasons, these changes may be of interest to a user and/or a system. For instance, depending on the types of changes occurring in an area, such changes may be indicative of an area that is experiencing economic development, corporate development, military development, and/or climate change of interest, as possibilities.

OVERVIEW

In order to detect changes in a given area, a system may be configured to obtain two or more successive images of the given area that were captured at different times and then perform an analysis to detect any changes between the successive images, which may be indicative of the changes in the given area. However, existing processes for image change detection often do not lead to an accurate indication of the changes that have actually occurred in the given area, because these processes are unable to distinguish between different temporal patterns of change that may appear in the images.

For instance, certain changes that are detected between successive images of the given area may be changes in temporary items that come and go in such images, like clouds, vehicles, people, etc., as opposed to a more permanent change that has taken place at the given area itself (such as the man-made or natural changes described above). The existing processes for image change detection are generally unable to distinguish between a temporary change caused by a change in cloud cover, vehicles, people, etc. (which may be referred to herein as "transient" or "reverting" changes) and a more permanent change to the given area itself that is caused by a man-made or naturally-occurring change to the landscape of a geographic area.

Moreover, with respect to more permanent changes to the given area itself, existing processes for image change detection are also generally unable to determine what state that change is in. For example, existing processes for image change detection are unable to determine whether a change between successive images of the given area reflects the final state of a change to the given area that has since remained substantially the same over some meaningful period of time (which may be referred to herein as a "persistent change") or whether it represent some intermediate state of a change that is in process and evolving (which may be referred to herein as an "ongoing change").

Thus, there is a need for a more accurate process for detecting changes between successive images of a given area that is able to identify temporal patterns of change that may appear in the images, such as persistent changes, ongoing changes, and/or reverting changes.

Disclosed herein are improved methods for identifying a temporal pattern of change (or generally a particular type of change) in an area (e.g., persistent changes vs. non-persistent changes) by analyzing successive images of the area of interest that are captured at different times. In practice, the disclosed methods for identifying such changes may be carried out in a network arrangement that may include an image data source, an image data analysis platform, and a client station that are communicatively coupled via a communication network. However, the disclosed methods may be carried out in other systems and/or by other devices as well.

The image data source may maintain images of various areas. These areas may take many different various forms, examples of which may include vacant land, a mining site, a construction site, a manufacturing plant, an airport, an oil field, a gas field, a city, town, neighborhood, etc. The images may be captured via a camera which in some instances may be mounted on a satellite or drone, as examples. Further, the images may be overhead imagery of the areas or may take some other form such as non-overhead images or even video. In accordance with the present disclosure, the image data source may maintain, for each given area, a set of at least three successive images captured at different points in time for a given area. The time interval between any two successive images of the given area may vary depending on the implementation, and in practice, this time interval could be on the order of days, weeks, months, or even years, as examples. However, it should also be understood that the time interval between successive images for a given area can impact whether a change is persistent or non-persistent, as described in further detail below.

Each image maintained by the image data source may comprise a respective set of image data, which may take various forms. For instance, a respective set of image data for a given image may include an ordered array of pixels, such as a one dimensional or multi-dimensional array of pixels, where each pixel may be associated with a spatial location and a set of one or more intensity values and/or color values. The intensity may be indicative of the amount of electromagnetic radiation within a particular band of frequencies for that pixel in the image. In another example, the intensity value may be a numerical value indicative of a gray level of the pixel. For example, pixels associated with rocks and trees may have an intensity value close to the minimum value and pixels associated with clouds may have an intensity value close to the maximum value. The color value may be represented as a set of numerical values indicative of an amount of red, green, or blue content in a pixel. The intensities can also correspond to frequency bands outside the visible light spectrum, such as infrared or ultraviolet radiation, or to physical quantities other than radiation such as elevation levels. Other variations are also possible.

In practice, the pixels in each respective set of image data for a given area may be divided into respective subsets of pixels, where each subset of pixels forms a given type of shape such as a polygon (e.g., a rectangle) or a curved shape (e.g., a circle). In this disclosure, regardless of shape, these respective subsets of pixels may be referred to as "pixel blocks." As one representative example, the pixels in a set of image data may be divided into $N_V \times N_H$ rectangular pixel blocks, where $N_V$ is the number of pixels in the vertical dimension included in each pixel block and $N_H$ is the number of pixels in the horizontal dimension included in each pixel block. Image data organized in this manner may then enable the disclosed system to perform its analysis of the image data based on groups of pixels in addition to or instead of individual pixels.

In each respective set of image data for a given area, the respective pixels and pixel blocks represent respective sub-areas of the given area. For example, each individual pixel in the set of image data represents a very small sub-area of the given area, while each pixel block in the set of image data represents a relatively larger sub-area of the given area. A system configured according to the disclosed method may evaluate the images for changes on a pixel-by-pixel level, a pixel block-by-block level, or based on some other subdivision of the area. For example, instead of dividing up and analyzing image data based on pixels, a system may divide up and analyze image data based on distinct objects identified in the image. Other examples are possible as well. In this disclosure, the term "sector" may be used to refer any discrete sub-area of a given area that is analyzed by a system configured according to the disclosed method, examples of which may include a pixel-sized sub-area, pixel-block-sized sub-area, a sub-area in which a discrete object is located (or not located), and/or a sub-area that is defined in some other manner.

Further, each respective set of image data for a given area may include or be associated with an indication of the time at which the image was captured. This indication may take various forms. As one possible example, the indication of the capture time may include a representation of the particular date when the image was captured (e.g., month, day, year) and perhaps also a representation of the particular time of day (e.g., hour, minute, and second) when the image was captured. The indication of capture time may take many other forms as well.

Further yet, each respective set of image data for a given area may include or be associated with location data for the given area. For example, the location data included in a respective set of image data for a given area may include a set of geographic coordinates that identifies a location of the given area, such as latitude and/or longitude, Cartesian coordinates, and/or GPS coordinates. For example, the location data may include a set of geographic coordinates that defines a boundary of the given area. As another example, the location data included in a respective set of image data for a given area may include an array of geographic coordinates that corresponds to the array of pixels for the given area. In this respect, the array of geographic coordinates may take various forms, examples of which may include a set of coordinates that each correspond to a respective pixel, a set of coordinates that each correspond to respective pixel block, or some other set of coordinates that bears a relationship to the image's array of pixels. In addition, each respective set of image data for a given area may also include or be associated with a geocode or the like, which the image data source may use to look up and access the set of image data.

The image data analysis platform, in turn, may generally be configured to obtain a set of successive images for a given area from the image data source and then analyze the successive images to identify one or more temporal patterns of change in the given area. The image data analysis platform may carry out these functions in various manners.

For instance, the image data analysis platform may first identify the given area that is to be analyzed for persistent changes. The image data analysis platform may perform this identification in various manners.

As one possibility, the image data analysis platform may be configured to identify the given area to analyze for one or more temporal patterns of change based on data received from the client station via the communication network. For instance, the client station may display a user interface (which may be controlled by the image data analysis platform) that enables a user to select a given area that is to be analyzed for persistent changes. This user interface may take various forms, examples of which may include an interactive map that enables the user to select the given area graphically and/or a set of text entry fields that enable the user to select the given area by inputting text that identifies the given area (e.g., a geocode, a set of geographic coordinates, etc.).

As another possibility, the image data analysis platform may be configured to identify the given area to analyze for one or more temporal patterns of change based on data indicating potential areas of interest. For example, the image data analysis server may maintain and/or otherwise have access to a list of areas that should be periodically analyzed for persistent changes (which may be generated by the platform itself or received from an external system), and the image data analysis platform may identify the given area to analyze based on this list.

As yet another possibility, the image data analysis platform may then be configured to identify the given area to analyze for one or more temporal patterns of change based on a notification. The notification may come from the image data source which is configured to notify the image data analysis platform when new image data becomes available for a given area.

The image data analysis platform may be configured to identify the given area to analyze for one or more temporal patterns of change in other manners as well.

After identifying the given area to analyze for one or more temporal patterns of change, the image data analysis platform may obtain a set of successive images for the given area from the image data source. For example, the image data analysis platform may send a request to the image data server that includes an identification of the given area (e.g., a geocode, a set of geographic coordinates, etc.), and as a result of this request, the image data analysis platform then receive a set of successive images for the given area. As another example, the image data source may be configured to automatically send (or "push") an updated set of successive images of a given area captured at different times to the image data analysis platform after a new image for the given area becomes available to the image data source. The image data analysis platform may obtain a set of successive images for the given area from the image data source in other manners as well.

After receiving the set of successive images for the given area, the image data analysis platform may then analyze the successive images to identify one or more temporal patterns of change in the given area, such as persistent changes, ongoing changes, and/or transient changes. In accordance with the present disclosure, the image data analysis platform may perform this analysis in various manners.

According to one example embodiment, the image data analysis platform may be configured to identify one or more temporal patterns of change in a given area based on a set of three successive images of the given area, where the first image in time may be referred to as the "reference" image, the second image in time may be referred to as the "target" image, and the third image in time may be referred to as the "target-plus-one" image. In this embodiment, the disclosed process for analyzing the successive images to identify persistent changes may generally involve (1) comparing the reference image to the target image to detect any changes between those two images of the given area, (2) comparing the reference image to the target-plus-one image to detect any changes between those two images of the given area, and (3) comparing the target image to the target-plus-one image to detect the absence of any changes between those two images of the given area.

The image data analysis platform may then evaluate the results of these three comparisons to identify a temporal pattern of change in the given area. For example, the image data analysis platform may evaluate the results of these three comparisons to identify any sub-area of the given area that exhibits a change from reference to target, a change from reference and target-plus-one, and an absence of change from target to target-plus-one, which is then deemed to be a persistent change (i.e., a change to the sub-area that has occurred and then remained substantially the same over some meaningful time interval). As another example, the image data analysis platform may evaluate the results of these three comparisons to identify any sub-area of the given area that exhibits a change from reference to target, a change from reference to target-plus-one, and a change from target to target-plus-one, which is then deemed to be an ongoing change (i.e., a change to the sub-area that is in-process and evolving). As yet another example, the image data analysis platform may evaluate the results of these three comparisons to identify any sub-area of the given area that exhibits a change from reference to target, a change from target to target-plus-one, and an absence of change from reference to target-plus-one, and which is then deemed to be a reverting change (i.e., a temporary change to the sub-area followed by a reversion back to the sub-area's initial state). This example embodiment will now be described in further detail.

In the first step of this example embodiment, the platform may compare the reference image to the target image to detect any changes between those two images. In practice, the platform may evaluate the images at a pixel level, a pixel block level, or based on some other subdivision of the area. For instance, if the evaluation is being performed at a pixel block level, the platform may compare each pixel block in the reference image to its complementary pixel block in the target image (i.e., the pixel blocks representing the same sector of the given area) and thereby determine a first likelihood of change between each pair of complementary pixel blocks at the different instances of time. In one example, the first likelihood of change may be represented as a probability value ranging from a minimum value of 0% to a maximum value of 100%, where a probability value closer to 0% indicates that there is a low likelihood of there being a change between the pair of complementary pixel blocks in the reference and target images and a probability value that is closer to 100% indicates that there is a high likelihood of there being a change between the pair of complementary pixel blocks in the reference and target images. Thus, as a result of this comparison, the platform may generate an array of probability values that indicate a first likelihood of change between the reference and target images for each respective sector of the given area.

Turning to the second step of this example embodiment, the image data analysis platform may compare the reference image to the target-plus-one image to detect any changes between those two images. As above, the platform may perform this evaluation at a pixel level, a pixel block level, or based on some other subdivision of the area. For instance, if the evaluation is being performed at a pixel block level, the platform may compare each pixel block in the reference image to its complementary pixel block in the target-plus-one image (i.e., the pixel blocks representing the same sector of the given area) and thereby determine a second likelihood of change (e.g., a probability value) between the reference and target-plus-one images for each respective sector of the given area.

In the third step of this example embodiment, the image data analysis platform may compare the target image to the target-plus-one image to detect a likelihood of change between those two images. As above, the platform may perform this evaluation at a pixel level, a pixel block level, or based on some other subdivision of the area. For instance, if the evaluation is being performed at a pixel block level, the platform may compare each pixel block in the target image to its complementary pixel block in the target-plus-one image (i.e., the pixel blocks representing the same sector of the given area) and thereby determine a third likelihood of change (e.g., a probability value) between the target and target-plus-one images for each respective sector of the given area.

The platform may use any technique now known or later developed to detect changes during these pairwise comparisons of the images, one example of which may take the form of an iteratively reweighted multivariate alteration detection (IR-MAD) technique.

After carrying out the three pairwise comparisons described above for each sector of the image, the image data analysis platform may then evaluate the results of the three pairwise comparisons to identify a temporal pattern of change in the given area. This evaluation may take various forms.

In one implementation, the image data analysis platform may be configured to compare the respective likelihood of change values output by each of the three pairwise comparisons to a respective threshold value, and then identify whether any sub-area of the given area exhibits the temporal pattern of change based on the results of these three threshold comparisons.

For instance, the platform may compare the first likelihood of change value for each respective sector of the given area to a first threshold level to determine whether there has been a meaningful change between the between the reference and target images in each sector. Based on this comparison, the image data analysis platform may determine that there has been a change between the reference and target images in a given sector if the first likelihood of change value for the given sector exceeds the first threshold level. On the other hand, the image data analysis platform may determine that there has been no change between the reference and target images in a given sector (or at least that it is inconclusive as to whether there has been a change in the given sector) if the first likelihood of change value for the given sector does not exceed the first threshold level.

Next, the platform may compare the second likelihood of change value for each respective sector of the given area to a second threshold level (which might be the same or different from the first threshold level) to determine whether there has been a meaningful change between the between the reference and target-plus-one images in each sector. Based on this comparison, the image data analysis platform may determine that there has been a change between the reference and target-plus-one images in a given sector if the second likelihood of change value for the given sector exceeds the second threshold level. On the other hand, the image data analysis platform may determine that there has been no change between the reference and target-plus-one images in a given sector (or at least that it is inconclusive as to whether there has been a change in the given sector) if the second likelihood of change value for the given sector does not exceed the second threshold level.

Lastly, the platform may compare the third likelihood of change value for each respective sector of the given area to a third threshold level (which may be the same or different from the first and/or second threshold levels) to determine whether there has been a meaningful change between the between the target and target-plus-one images in the given sector. Based on this comparison, the image data analysis platform may determine that there has been a change between the target and target-plus-one images in a given sector if the third likelihood of change value for the given sector exceeds the third threshold level. On the other hand, the image data analysis platform may determine that there has been no change (i.e., that there is an absence of change) between the target and target-plus-one images in the given sector if the third likelihood of change value for the given sector does not exceed the third threshold level.

In turn, the image data platform may evaluate the results of these threshold comparisons to identify a temporal pattern of change in the given area. For example, the platform may identify persistent changes in the given area by identifying any sector of the given area (e.g., any set of complementary pixel blocks) that has (1) a first likelihood of change value between the reference and target images that exceeds the first threshold value (which indicates a change between the first and second instances of time), (2) a second likelihood of change value between the reference and target-plus-one images that exceeds the second threshold value (which indicates a change between the first and third instances of time), and (3) a third likelihood of change value between the target and target-plus-one images that falls below the third threshold value (which indicates the absence of a change between the second and third instances of time). Such a combination demonstrates that a change occurred in the sector of the given area between the first and second instances of time and that the same change persisted between the second and third instances of time, thereby indicating a persistent change.

As another example, the platform may identify ongoing changes in the given area by identifying any sector of the given area (e.g., any set of complementary pixel blocks) that has (1) a first likelihood of change value between the reference and target images that exceeds the first threshold value (which indicates a change between the first and second instances of time), (2) a second likelihood of change value between the reference and target-plus-one images that exceeds the second threshold value (which indicates a change between the first and third instances of time), and (3) a third likelihood of change value between the target and target-plus-one images that exceeds the third threshold value (which indicates a change between the second and third instances of time). Such a combination demonstrates that there was a change in the sector of the given area between the first and second instances of time and then another change in the sector between the second and third instances of time, thereby indicating an ongoing change.

As yet another example, the platform may identify reverting changes in the given area by identifying any sector of the given area (e.g., any set of complementary pixel blocks) that has (1) a first likelihood of change value between the reference and target images that exceeds the first threshold value (which indicates a change between the first and second instances of time), (2) a second likelihood of change value between the reference and target-plus-one images that falls below the second threshold value (which indicates an absence of change between the first and third instances of time), and (3) a third likelihood of change value between the target and target-plus-one images that exceeds the third threshold value (which indicates a change between the second and third instances of time). Such a combination demonstrates that there was a change in the sector of the given area between the first and second instances of time but that the sector reverted back to its initial state between the second and third instances of time, thereby indicating a reverting change.

Other implementations for evaluating the results of the three pairwise comparisons to identify a temporal pattern of change in the given area exist as well. For instance, instead of comparing the respective outputs of the pairwise comparison to respective thresholds and then identifying a temporal pattern of change based on the results of those threshold comparisons, the platform may be configured to aggregate the respective outputs of the pairwise comparisons together into an aggregated value (e.g., by multiplying the outputs together) and then comparing the aggregated value to a single threshold value. In this respect, the manner in which the respective outputs of the pairwise comparisons are aggregated together is dictated by the temporal pattern of change that the platform is attempting to identify. For example, if the platform is attempting to identify a persistent change, the platform may multiply the first likelihood value, the second likelihood value, and the complement of the third likelihood value (such that the value is represented in terms of absence of change). As another example, if the platform is attempting to identify an ongoing change, the platform may multiply the first likelihood value, the second likelihood value, and the third likelihood value. As yet another example, if the platform is attempting to identify a reverting change, the platform may multiply the first likelihood value, the complement of the second likelihood value (such that the value is represented in terms of absence of change), and the third likelihood value. Other implementations are possible as well.

After analyzing the successive images of the given area, the platform may then generate output data indicating where one or more temporal patterns of change have been identified in the given area. This output data may take various forms.

In one implementation, the output data may take the form of an array of indicators, where each indicator in the array corresponds to a respective sector of the given area and indicates whether a temporal pattern change (e.g., a persistent change) has been identified in that sector. The indicators themselves might take various forms. As one example, the indicator corresponding to each respective sector may take the form of a binary one or zero value, where a one value indicates a presence of a temporal pattern of change in the respective sector and a zero value indicates an absence of a temporal pattern of change in the respective sector (or vice versa).

As another example, the indicator corresponding to each respective sector may take the form of a probability value (which may also be referred to herein as a "confidence level") ranging from 0 to 100%, where a value closer to 0% indicates that a temporal pattern of change is less likely to have occurred at the given sector and a value closer to 100% indicates that the temporal pattern of change is more likely to have occurred at the given sector. In practice, this confidence level may be determined based on the probability values discussed above. For instance, if a given sector exhibits a likelihood of change between the reference and target images that comfortably exceeds the first threshold, a likelihood of change between the reference and target-plusone images that comfortably exceeds the second threshold, and a likelihood of change between the target and target-plus-one images that comfortably falls below the third threshold, the image data analysis platform may have a higher confidence level in its determination that the given sector exhibits a persistent change. On the other hand, if a given sector exhibits a likelihood of change between the reference and target images that barely exceeds the first threshold, a likelihood of change between the reference and target-plus-one images that barely exceeds the second threshold, and a likelihood of change between the target and target-plus-one images that barely falls below the third threshold, the image data analysis platform may have a lower confidence level in its determination that the given sector exhibits a persistent change.

In another implementation, the output data indicating where one or more temporal patterns of change have been identified in the given area may include location data for each sub-area of the given area that exhibits a temporal pattern change, where the sub-area may be an individual sector or a broader region that encompasses multiple sectors. In this respect, the platform may perform a further analysis of the data identifying the sectors in which a temporal pattern of change has been identified to identify broader regions in the given area where there are "clusters" of such sectors. For example, the platform may look at a set of sectors in a broader region of the given area (e.g., sectors within a given distance of one another) to determine the extent of sectors within that region that exhibit a temporal pattern of change. If the determined extent exceeds a threshold (e.g., a threshold percentage, threshold total number, etc.), the platform may determine that the broader region exhibits the temporal pattern of change and then generate location data for that broader region, which may be included in the output data for the given area.

The output data indicating where one or more temporal patterns of change have been identified in the given area may take other forms as well.

After identifying one or more regions in the given area that exhibit a temporal pattern of change, the image data analysis platform may take various actions.

In one example, the image data analysis platform may cause the client station in the network arrangement to display a visual representation of the one or more sectors (or regions) in the given area that exhibit the temporal pattern of change. For example, the visual representation may the form of a map of the given area that includes indicators of the one or more sectors (or regions) that exhibit the temporal pattern of change. In addition to the indicators of the one or more regions that exhibit the temporal pattern of change, the map could also optionally include indicators of other sectors (or regions) that exhibit other temporal patterns of change as well. In this respect, different colors may be used to identify the different types of changes on the map. To illustrate, pixels associated with persistent changes may be shown as one color, while pixels associated with other temporal patterns of change (e.g., reverting and/or ongoing changes) may be shown as other colors. In some examples, the visual representation may also include an indication of the image data analysis platform's confidence level in its identification of each sector (or region) that exhibits a temporal pattern of change. For example, if the visual representation takes the form of a map as described above, the size, color, and/or transparency level of the indicator for a given sector (or region) may reflect the image data analysis platform's confidence level in its determination that the given sector (or region) exhibits the temporal pattern of change.

In a second example, the image data analysis platform may provide a notification instead of or in addition to the described visual representation. The notification may take the form of a message such as an email or text message or audible indication that the temporal pattern of change has been detected in a sector (or region).

As discussed above, the examples provided herein are related to a method and a corresponding system for identifying a particular temporal pattern of change (e.g., persistent change) in an area of interest by analyzing successive images of the area of interest that are captured at different times.

In one aspect, a first method is disclosed. According to the first method, a set of successive images is received for a given area from an image data source via a communication network, wherein the set of successive images comprises a first image captured at a first time, a second image captured at a second time, and third image captured at a third time, and wherein the given area comprises a plurality of sectors. A determination is made for each respective sector of the given area of (i) a first likelihood of change between the first image captured at the first time and the second image captured at the second time, (ii) a second likelihood of change between the first image captured at the first time and the third image captured at the third time, and (iii) a third likelihood of change between second image captured at the second time and the third image captured at the third time. The first, second, and third likelihood of change for each respective sector of the given area is evaluated to identify any sector of the given area that exhibits a given type of change. Data is output to a client station via the communication network indicating that the given type of change has occurred at each identified sector of the given area.

In another aspect, a second method is disclosed. According to the second method, a set of successive images is received for a given area from an image data source via a communication network, wherein the set of successive images comprises a first image captured at a first time, a second image captured at a second time, and third image captured at a third time. A first comparison is performed between the first image captured at the first time and the second image captured at the second time to detect any change between the first and second images. A second comparison is performed between the first image captured at the first time and the third image captured at the third time to detect any change between the first and third images. A third comparison is performed between the second image captured at the second time and the third image captured at the third time to detect an absence of any change between the second and third images. Based on the first, second, and third comparisons, at least one sub-area of the given area is identified that exhibits a change between the first and second images, a change between the second and third images, and an absence of change between the second and third images. Data is output to a client station via the communication network indicating that a persistent change has occurred at the at least one sub-area of the given area.

In yet another aspect, a computer system is disclosed. This computer system includes a network interface that is configured to communicatively couple the computing system to (a) at least one image data source and (b) at least one client station; at least one processor; a non-transitory computer-readable medium; and program instructions stored on the non-transitory computer-readable medium that are executable by at least one processor to cause the computing system receive a set of successive images for a given area from an image data source via the network interface, wherein the set of successive images comprises a first image captured at a first time, a second image captured at a second time, and third image captured at a third time, and wherein the given area comprises a plurality of sectors; determine, for each respective sector of the given area, (i) a first likelihood of change between the first image captured at the first time and the second image captured at the second time, (ii) a second likelihood of change between the first image captured at the first time and the third image captured at the third time, and (iii) a third likelihood of change between second image captured at the second time and the third image captured at the third time; evaluate the first, second, and third likelihood of change for each respective sector of the given area to identify any sector of the given area that exhibits a given type of change; and output, to a client station via the network interface, data indicating that the given type of change has occurred at each identified sector of the given area.

In a fourth aspect, a computing system comprises: a network interface configured to communicatively couple the computing system to (a) at least one image data source and (b) at least one client station; at least one processor; a non-transitory computer-readable medium; and program instructions stored on the non-transitory computer-readable medium that are executable by the at least one processor to cause the computing system to: receive a set of successive images for a given area from an image data source via the network interface, wherein the set of successive images comprises a first image captured at a first time, a second image captured at a second time, and third image captured at a third time; perform a first comparison between the first image captured at the first time and the second image captured at the second time to detect any change between the first and second images; perform a second comparison between the first image captured at the first time and the third image captured at the third time to detect any change between the first and third images; perform a third comparison between the second image captured at the second time and the third image captured at the third time to detect an absence of any change between the second and third images; based on the first, second, and third comparisons, identify at least one sub-area of the given area that exhibits a change between the first and second images, a change between the second and third images, and an absence of change between the second and third images; and output, to a client station via the network interface, data indicating that a persistent change has occurred at the at least one sub-area of the given area.

One of ordinary skill in the art will appreciate these as well as numerous other aspects in reading the following disclosure.

Figure 1:
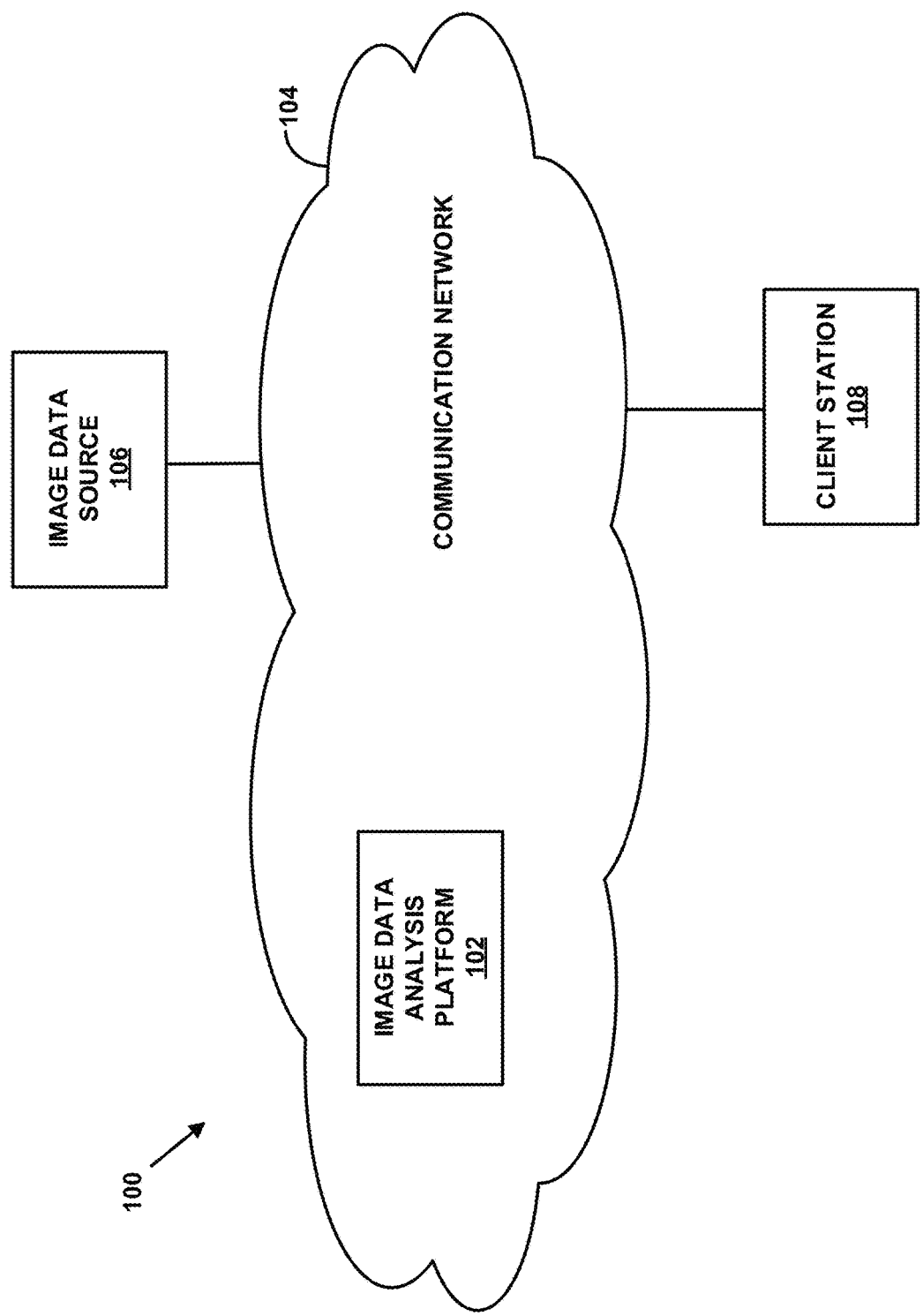
FIG. 1 depicts an example network configuration in which example embodiments may be implemented.

The drawings are for purpose of illustrating example embodiments, but it is understood that the inventions are not limited to the arrangements and instrumentality shown in the drawings.

DETAILED DESCRIPTION

The following disclosure refers to the accompanying figures and several exemplary scenarios. One of ordinary skill in the art will understand that such references are for the purpose of explanation only and are therefore not meant to be limiting. Part or all of the disclosed systems, devices, and methods may be rearranged, combined, added to, and/or removed in a variety of manners, each of which is contemplated herein.

I. Example Network Configuration

Turning now to the figures, FIG. 1 depicts an example network configuration 100 in which example embodiments may be implemented. At its core, the network configuration 100 may include an image data analysis platform 102 which is configured to communicate via a communication network 104 with one or more image data sources such as representative image data source 106 and one or more output systems, such as representative client station 108. It should be understood that the network configuration 100 may include various other systems as well.

Broadly speaking, the image data analysis platform 102 may be configured to receive, process, and/or analyze images of an area to determine persistent changes in the area. For instance, the image data analysis platform 102 may include one or more servers (or the like) having hardware components and software components that are configured to carry out one or more of the functions disclosed herein for receiving, processing, and/or analyzing the images. Additionally, the image data analysis platform 102 may include one or more user interface components that enable an image data analysis platform user to interface with the one or more servers. In practice, the image data analysis platform 102 may be located in a single physical location or distributed amongst a plurality of locations, and may be communicatively linked via a system bus, a communication network (e.g., a private network), or some other connection mechanism.

As shown in FIG. 1, the image data analysis platform 102 may be configured to communicate, via the communication network 104, with the one or more image data sources and one or more output systems in the network configuration 100. For example, the image data analysis platform 102 may receive for a given area via the communication network 104 successive images captured at different times from the image data source 106. The set of images may take the form of successive images of natural and artificial features of a given area, among other examples, captured at different times for the given area. As another example, the image data analysis platform 102 may transmit output data based on processing, and/or analyzing the images, via the communication network 104, for receipt by an output system, such as the client station 108. The image data analysis platform 102 may engage in other types of communication via the communication network 104 as well.

In general, the communication network 104 may include one or more computing systems and network infrastructure configured to facilitate transferring data between the computing system and the one or more sources, and/or output systems in the network configuration 100. The communication network 104 may be or may include one or more Wide-Area Networks (WANs) and/or Local-Area Networks (LANs), which may be wired and/or wireless and may support secure communication. In some examples, the communication network 104 may include one or more cellular networks and/or the Internet, among other networks. The communication network 104 may operate according to one or more communication protocols, such as LTE, CDMA, GSM, LPWAN, WiFi, Bluetooth, Ethernet, HTTP/S, TCP, CoAP/DTLS and the like. Although the communication network 104 is shown as a single network, it should be understood that the communication network 104 may include multiple, distinct networks that are themselves communicatively linked. Further, in example cases, the communication network 104 may facilitate secure communications between network components (e.g., via encryption or other security measures). The communication network 104 could take other forms as well.

Further, although not shown, the communication path between the image data analysis platform 102 and the one or more image data sources and/or output systems may include one or more intermediate systems. For example, the one or more image data sources may send images to one or more intermediary systems, such as a gateway, and the computing system may then be configured to receive the images from the one or more intermediary systems. As another example, the image data analysis platform 102 may communicate with an output system via one or more intermediary systems, such as a host server (not shown). Many other configurations are also possible.

In general, the image data source 106 may be configured to maintain, e.g., collect, store, and/or provide, sets of images captured by a satellite, camera, drone, and/or other remote-sensor images relevant to the functions performed by the image data analysis platform 102. The image data source 106 could take the form of an image server which has hardware, e.g., storage, and software to maintain the sets of images. Further, the image server may include a plurality of different image data servers where images for certain areas and/or images captured at certain times are maintained by certain servers. The image server may also maintain image data associated with the images. The image data may include an ordered array of pixels for a given image, a time indicator indicating a time when the given image was captured, location data which indicates a location of a given area associated with the given image, among other types of image data as described in further detail below.

The image data analysis platform 102 may receive images from the image data source 106 in various manners. For example, the image data analysis platform 102 may be configured to periodically request and receive images from the image data source 106. In another example, the image data analysis platform 102 may receive images from the image data source 106 by "subscribing" to a service provided by the image data source 106. The image data analysis platform 102 may receive images from the image data source 106 in other manners as well.

The client station 108 may take the form of a system or device configured to access and enable a user to interact with the image data analysis platform 102. To facilitate this, the client station 108 may include hardware components such as a user interface, a network interface, a processor, and data storage, among other components. Additionally, the client station 108 may be configured with software components that enable interaction with the image data analysis platform 102, such as a web browser that is capable of accessing a web application provided by the image data analysis platform 102 or a native client application associated with the computing system, among other examples. Representative examples of client stations 108 may include a desktop computer, a laptop, a netbook, a tablet, a smartphone, a personal digital assistant (PDA), or any other such device now known or later developed.

II. Example Image Data Analysis Platform

Figure 2:
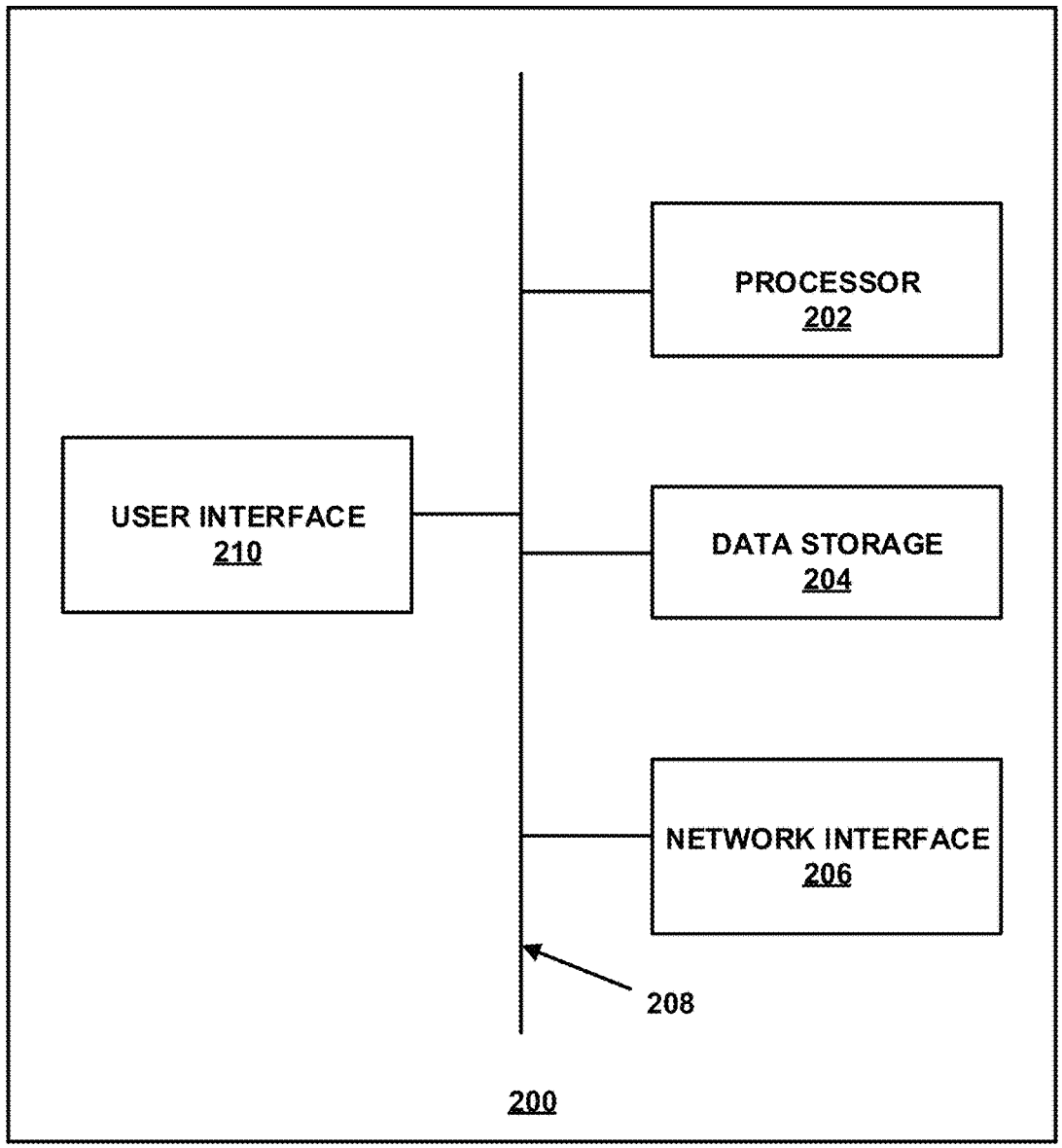
FIG. 2 is a functional block diagram of an example image data analysis platform.

FIG. 2 is a simplified block diagram illustrating some components that may be included in an example image data analysis platform 200 from a structural perspective. In line with the discussion above, the image data analysis platform 200 may generally comprise one or more computer systems (e.g., one or more servers), and these one or more computer systems may collectively include at least a processor 202, data storage 204, network interface 206, and perhaps also a user interface 210, all of which may be communicatively linked by a communication link 208 such as a system bus, network, or other connection mechanism.

The processor 202 may include one or more processors and/or controllers, which may take the form of a general or special-purpose processor or controller. In particular, in example implementations, the processing unit 202 may include microprocessors, microcontrollers, application-specific integrated circuits, digital signal processors, and the like.

In turn, data storage 204 may comprise one or more non-transitory computer-readable storage mediums, examples of which may include volatile storage mediums such as random access memory, registers, cache, etc. and non-volatile storage mediums such as read-only memory, a hard-disk drive, a solid-state drive, flash memory, an optical-storage device, etc.

As shown in FIG. 2, the data storage 204 may be provisioned with software components that enable the image data analysis platform 200 to carry out the functions disclosed herein. These software components may generally take the form of program instructions that are executable by the processor 202, and may be arranged together into applications, software development kits, toolsets, or the like. In addition, the data storage 204 may also be provisioned with one or more databases that are arranged to store data related to the functions carried out by the image data analysis platform 200, examples of which include time-series databases, document databases, relational databases (e.g., MySQL), key-value databases, and graph databases, among others. The one or more databases may also provide for polyglot storage.

The network interface 206 may be configured to facilitate wireless and/or wired communication between the image data analysis platform 200 and various network components via the communication network, such as image data sources and client stations. As such, network interface 206 may take any suitable form for carrying out these functions, examples of which may include an Ethernet interface, a serial bus interface (e.g., Firewire, USB 2.0, etc.), a chipset and antenna adapted to facilitate wireless communication, and/or any other interface that provides for wired and/or wireless communication. Network interface 206 may also include multiple network interfaces that support various different types of network connections, some examples of which may include Hadoop, FTP, relational databases, high frequency data such as OSI PI, batch data such as WL, and Base64. Other configurations are possible as well.

The example image data analysis platform 200 may also support a user interface 210 that is configured to facilitate user interaction with the platform 200. Additionally, the user interface 210 may be used to cause the image data analysis platform 200 to perform an operation. This user interface 210 may include or provide connectivity to various input components, examples of which include touch-sensitive interfaces, mechanical interfaces (e.g., levers, buttons, wheels, dials, keyboards, etc.), and other input interfaces (e.g., microphones). Additionally, the user interface 210 may include or provide connectivity to various output components, examples of which may include display screens, speakers, headphone jacks, and the like. Other configurations are possible as well, including the possibility that the user interface 210 is embodied within a client station that is communicatively coupled to the example platform.

III. Example Operations

Example operations of the example network configuration 100 depicted in FIG. 1 will now be discussed in further detail below. To help describe some of these operations, flow diagrams may be referenced to describe combinations of operations that may be performed. In some cases, each block may represent a module or portion of program code that includes instructions that are executable by a processor to implement specific logical functions or steps in a process. The program code may be stored on any type of computer-readable medium, such as non-transitory computer-readable media. In other cases, each block may represent circuitry that is wired to perform specific logical functions or steps in a process. Moreover, the blocks shown in the flow diagrams may be rearranged into different orders, combined into fewer blocks, separated into additional blocks, and/or removed based upon the particular embodiment.

As noted above, disclosed herein are improved methods (and corresponding systems and devices) for identifying temporal patterns of change in an area (or generally particular types of changes in the area) by analyzing successive images of the area that are captured at different times. The area may take different forms, examples of which may include a localized area such as vacant land, a mining site, a construction site, a manufacturing plant, an airport, oil field, a gas field etc. or a larger area such as a city, town, neighborhood etc. However, the described embodiments are not limited by the size, location, or nature of the area.

The temporal patterns of change identified by the disclosed method may take the form of persistent changes, ongoing changes, and/or reverting changes. A persistent change may generally reflect the final state of a change to a given area that has since remained substantially same over some meaningful time interval. Examples of persistent changes may include man-made changes that are at or near completion, such as the end result of a structure being built, a pit, trench, etc. being dug, and/or a previously-existing feature of being destroyed, as well as naturally occurring changes that are at or near completion, such as the end result of a landform being formed, vegetation being grown, and/or land being eroded.

An ongoing change may generally reflect an intermediate state of a change that is in process and evolving. An ongoing change may be a persistent change that has not yet been completed, or the result of one change process that is followed by another change process. Thus, examples of ongoing changes may also include man-made changes that are in progress, such as the in-progress building of a structure, the in-progress digging of a pit, trench, etc., and the in-progress destruction of a previously-existing feature of an area such as a building, as well as naturally occurring changes that are in progress, such as the in-progress formation of a landform, the in-progress growth of vegetation, and/or the in-progress erosion of land.

A reverting (or transient) change may generally reflect a more temporary change to a given area that is followed by the given area reverting back to its previous state, which may be caused by transient items such as clouds, snow, rain, vehicles, people, etc. that may temporarily appear in images of the given area.

Further, a time interval between any two successive images of the area of interest that are captured may vary depending on the implementation, and in practice, this time interval could be on the order of days, weeks, months, or even years. As one possible example, a satellite which circles the earth every 24 hours might capture the image of an area every 24 hours whenever it reaches a same point over the Earth, in which case the time interval between images may be 24 hours. As another possible example, a camera located at a fixed location might capture an image of the area every year, in which case the time interval may be 1 year. Of course, numerous other examples of time intervals are possible as well. For example, it is possible that a set of successive images having smaller time intervals may be aggregated together into a single, aggregated image that is representative of the set of images, which may then be treated as a single image by the image data platform. As another example, it is possible that the image data platform may use successive images for a given area having a larger time interval even where images for the given area having smaller time intervals are also available (e.g., the platform may choose to use monthly or even yearly images even if weekly images are available). As yet another example, it is possible that the time interval between different pairs of successive images may differ from one another.

It should also be understood that the time interval between successive images of the area of interest can affect whether the change in the area is a persistent change, ongoing change, or reverting change. For example, if it takes one year to build a building in an area and a useful lifetime of a building is 15 years, then capturing three successive images of the area every 10 years starting when the building is built might show the building being built, completed, and then torn down in the 30-year period. The first image and last image might look the same if the area is returned to an original state of before when the building was built. As a result, there may be a reverting change in the area. In another example, if three successive images of the area are captured every 5 years starting when the building is built, the images may show no building for a first image and a completed building in the other images. In this case, the area within a 15-year period might show a persistent change. In yet another example, if three successive images of the area are captured every 30 days starting when the building is built, the images may show no building for a first image and images of a partially completed building at progressing stages of construction in the images captured at 60 days and 90 days. In this case, the area within a 90 day period might show an ongoing change. There may be many other examples of persistent changes, ongoing changes, and/or reverting changes in an area.

Figure 3:
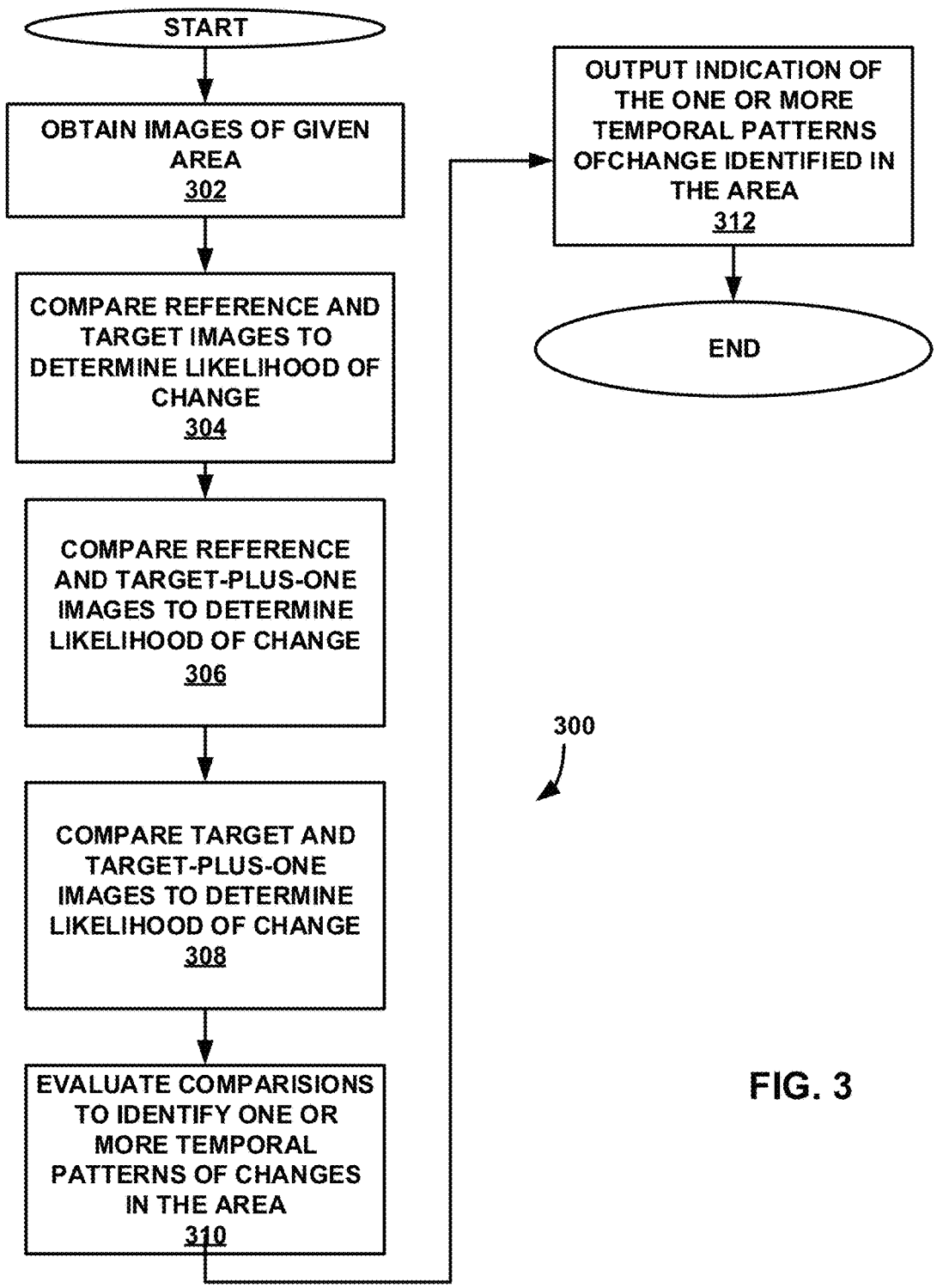
FIG. 3 is a flow diagram of example functions associated with detecting one or more temporal patterns of change in images of an area.

FIG. 3 is a flow diagram of example functions 300 associated with one embodiment of the disclosed process for detecting one or more temporal patterns of change in an given area, such as persistent changes, ongoing changes, and/or reverting changes. Briefly, at block 302, images may be obtained for a given area. The images may include successive images of the given area captured at different times, where a first image may be a reference image, a second image may be a target image, and a third image may be a target-plus-one image. At block 304, the reference image and the target image may be compared to determine a likelihood of change in the images. The likelihood of change may be represented as a probability value. At block 306, the reference image and the target-plus-one image may be compared to determine a likelihood of change in the images. At block 308, the target image and the target-plus-one image may be compared to determine a likelihood of change in the images. At block 310, the respective outputs of these three pairwise comparisons may be evaluated to identify one or more temporal patterns of change in the given area. At block 312, an indication may be output indicative of the one or more temporal patterns of change identified in the given area. As described below, the functions 300 at blocks 302-312 may be performed by the image data analysis platform. However, in some cases, one or more of the image data source, client station, or some other network device may perform these functions instead of or in addition to the image data analysis platform.

Referring back to FIG. 3, at block 302, the image data analysis platform may obtain images of a given area, e.g., from the data source. The images may be a set of images which, in some instances, may take the form of successive images of the given area captured at different times for which persistent change is to be determined. Each image may comprise a respective set of image data which may take various forms.

Figure 4:
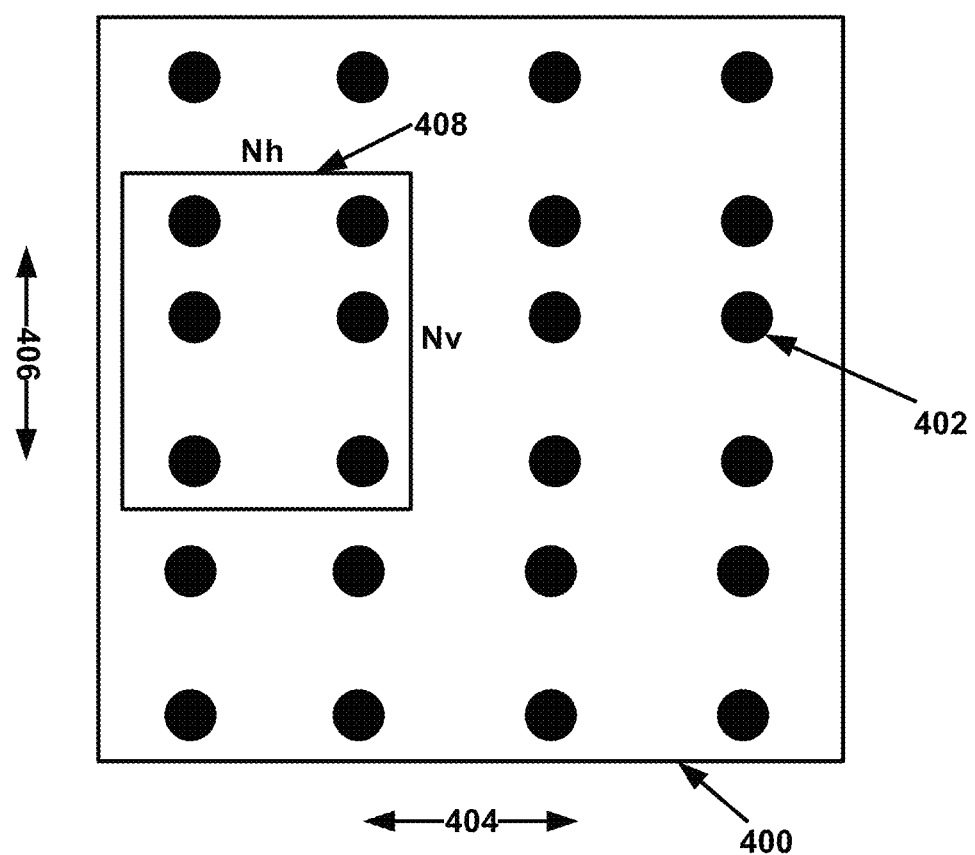
FIG. 4 shows an example of image data in the form of a two-dimensional array.

FIG. 4 shows an example of the image data in the form of an ordered array of pixels 400. The ordered array of pixels 400 shown in FIG. 4 is a two-dimensional array composed of pixels 402 organized in a horizontal dimension 404 and a vertical dimension 406. In the horizontal dimension 404, the example ordered array of pixels 400 may have 4 pixels and in the vertical dimension 406 the ordered array of pixels 400 may have 6 pixels such that the ordered array 400 has 24 pixels in total. In practice, however, the ordered array of pixels 400 associated with an image could have thousands of pixels in each dimension and in total. Further, the ordered array of pixels may take the form of a one dimensional instead of a two-dimensional array, or generally a multi-dimensional array of pixels. The ordered array of pixels 400 could be organized in as a polygon (e.g., rectangle) as shown in FIG. 4 or a curved shape (e.g., circle), among other organizations.

Each pixel may be associated with a spatial location and a set of one or more intensity values. The intensity may be indicative of the amount of electromagnetic radiation within a particular band of frequencies for that pixel in the image. In another example, the intensity value may be a numerical value indicative of a gray level of the pixel. For example, pixels associated with rocks and trees may have an intensity value close to the minimum value and pixels associated with clouds may have an intensity value close to the maximum value. The color value may be represented as a set of numerical values indicative of an amount of red, green, or blue content in a pixel e.g., water may be represented by a high amount of blue content while grass may be represented by higher amounts of green content. The intensities can also correspond to frequency bands outside the visible light spectrum, such as infrared or ultraviolet radiation, or to physical quantities other than radiation such as elevation levels. Other variations are also possible.

The successive images that are captured for the given area may have a same resolution, e.g., a same number of pixels in each image. In the event that, for example, the images provided by the image data source do not have the same resolution, the image data analysis platform may adjust a number of pixels in one or more of the images so that they have a same resolution. For example, the image data analysis platform may apply one or more filters to downsample or upsample the pixels in one or more of the images so that the images have a same resolution. In other arrangements, the image data analysis platform may account for the different resolutions during the disclosed processing.

In practice, the individual pixels in each respective set of a respective set of image data for a given area may be divided into respective subsets of pixels, where each subset of pixels forms a given type of shape such as a polygon (e.g., a rectangle) or a curved shape (e.g., a circle). In this disclosure, regardless of shape, these respective subsets of pixels may be referred to as "pixel blocks." As one representative example, the i pixels in a set of image data may be divided into $N_V \times N_H$ rectangular pixel blocks 408, where $N_V$ is the number of pixels in the vertical dimension included in each pixel block and $N_H$ is the number of pixels in the horizontal dimension included in each pixel block. In the example pixel block 408, $N_v=3$ and $N_h=2$. Image data organized in this manner may then enable the disclosed system to perform its analysis of the image data based on groups of pixels, rather than or in addition to the individual pixels.

In each respective set of image data for the area, the respective pixels and pixel blocks represent respective sub-areas of the area. For example, each individual pixel in the set of image data represents a very small sub-area of the given area, while each pixel block in the set of image data represents a relatively larger sub-area of the area. A system configured according to the disclosed method may evaluate the images for changes on a pixel-by-pixel level, a pixel block-by-block level, or based on some other subdivision of the area. For example, instead of dividing up and analyzing image data based on pixels, a system may divide up and analyze image data based on distinct objects identified in the image. Other examples are possible as well. In this disclosure, the term "sector" may be used to refer to any discrete a sub-area of a given area that is analyzed by a system configured according to the disclosed method, examples of which may include a pixel-sized sub-area, pixel-block-sized sub-area, a sub-area in which a discrete object is located (or not located), and/or a sub-area that is defined in some other manner. Further, each respective set of image data for the area may include or be associated with an indication of the time at which the image was captured. This indication may take various forms. As one possible example, the indication of the capture time may include a representation of the particular date when the image was captured (e.g., month, day, year) and perhaps also a representation of the particular time of day (e.g., hour, minute, and second) when the image was captured. The indication of capture time may take many other forms as well.

Further yet, each respective set of image data for the given area may include or be associated with location data. This location data may take various forms.

In one embodiment, the location data included in a respective set of image data for a given area may include a set of geographic coordinates that identifies a location of the given area, such as latitude and/or longitude, Cartesian coordinates, and/or GPS coordinates. For example, the location data may include a set of geographic coordinates that defines a boundary of the area. As another example, the location data included in a respective set of image data for the area may include an array of geographic coordinates that corresponds to the array of pixels for the area. In this respect, the array of geographic coordinates may take various forms, examples of which may include a set of coordinates that each correspond to a respective pixel, a set of coordinates that each correspond to respective pixel block, or some other set of coordinates that bears a relationship to the image's ordered array of pixels.

In another embodiment, the location data included in a respective set of image data for a given area may include a single geographic coordinate (e.g., the centroid) and an array of offset values that corresponds to the array of pixels for the given area on a pixel-by-pixel basis, a block-by-block basis, or the like. In this respect, the geographic coordinate for the area may be represented as an (x,y) value and the offset values corresponding to the pixels may each be represented as a respective (a,b) value, such that the geographic coordinate of an individual pixel or pixel block may have a value of (x+a, y+b).

In yet another embodiment, the location data included in a respective set of image data for a given area may include a single geographic coordinate (e.g., the centroid) and at least one resolution value that indicates a relationship between number of pixels and distance in the image. For example, a resolution value may indicate how many pixels are included in the image data per unit of distance measurement (e.g., foot, yard, mile, etc.). The disclosed system may then use the geographic coordinate and the resolution value to determine the location of particular pixels, pixel blocks, or the like within the image data.

In addition to the more detailed location data described above, each respective set of image data for the area may also include or be associated with a geocode or the like, which the image data source may use to look up and access the set of image data. Each respective set of image data for a given area (including the location data) may take various other forms as well.

The image data analysis platform may be configured to identify an area of interest (e.g., given area) to analyze for one or more temporal patterns of change in a variety of ways.

As one possibility, the image data analysis platform may be configured to identify the given area to analyze for one or more temporal patterns of change based on data received from the client station via the communication network. For instance, the client station may display a user interface (which may be driven by the image data analysis platform) that enables a user to select a given area that is to be analyzed for persistent changes. This user interface may take various forms, examples of which may include an interactive map that enables the user to select the given area graphically and/or a set of text entry fields that enable the user to select the given area by inputting text that identifies the given area (e.g., a geocode, a set of geographic coordinates, etc.).

As another possibility, the image data analysis platform may be configured to identify the given area to analyze for one or more temporal patterns of change based on data indicating potential areas of interest. For example, the image data analysis server may maintain and/or otherwise have access to a list of areas that should be periodically analyzed for persistent changes (which may be generated by the platform itself or received from an external system), and the image data analysis platform may identify the area to analyze based on this list.

As yet another possibility, the image data source may be configured to notify the image data analysis platform when new image data becomes available for a given area. The notification may be a message sent to the image data analysis platform via the communication network which identifies the given area, e.g., by providing location data. The image data analysis platform may then be configured to identify the given area to analyze for one or more temporal patterns of change based on this notification.

The image data analysis platform may be configured to identify the given area to analyze for one or more temporal patterns of change in other manners as well.

After identifying the given area to analyze for one or more temporal patterns of change, the image data analysis platform may obtain a set of successive images for the given area from the image data source. For example, the image data analysis platform may send a request to the image data server that includes an identification of the given area (e.g., a geocode, a set of geographic coordinates, etc.), and as a result of this request, the image data analysis platform then receive a set of successive images for the given area. As another example, the image data source may be configured to automatically send (or "push") an updated set of successive images for a given area to the image data analysis platform after a new image for the given area becomes available to the image data source. The image data analysis platform may then determine based on the image data associated with the images whether the given area is associated with an area of interest. The image data analysis platform may obtain a set of successive images for the given area from the image data source in other manners as well.

Figure 5:
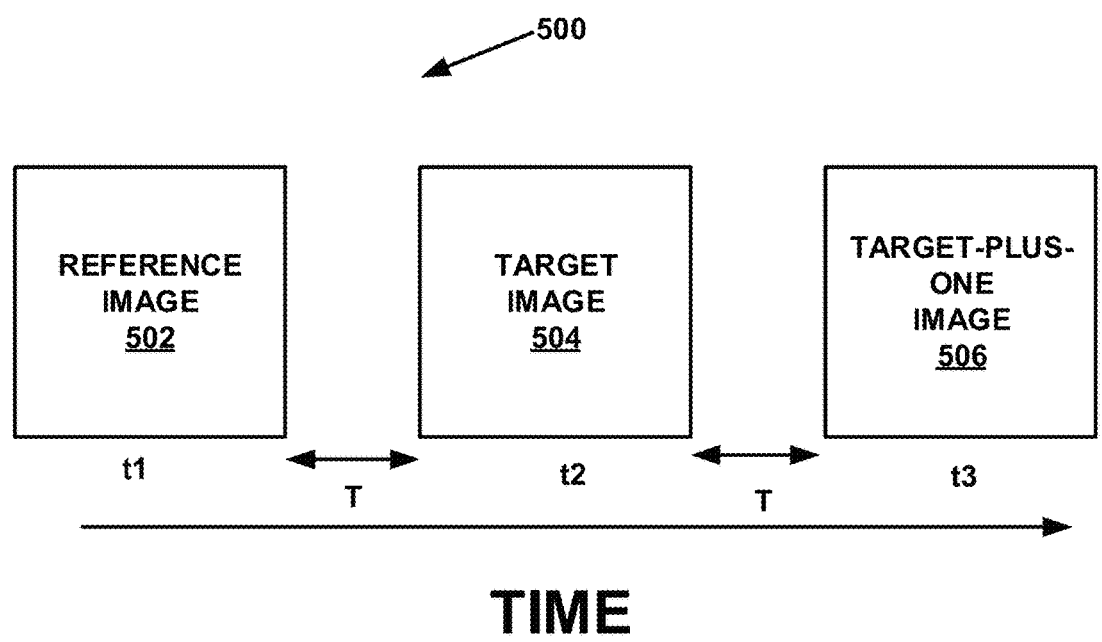
FIG. 5 shows an example of successive images that are captured at different times and used to detect one or more temporal patterns of change in an area.

FIG. 5 shows an example of three successive images 500 of a given area captured at different times. The three successive images 500 may have been received from the image data source. The first image 502 of the three successive images 500 may be an earliest captured image of the three images captured. The second image 504 of the three successive images 500 may be an image captured after the first image 502 in time. The third image 506 of the three successive images 500 may be image captured after the first image 502 and the second image 504 in time. In the three successive images 500, the first image 502 in time may be characterized as a "reference image", the second image in time 504 may be characterized as a "target image", and the third image in time 506 may be characterized as a "target-plus-one" image.

In some examples, each image of the three successive images 500 may be captured at a particular time t1, t2, t3 where t1<t2<t3. Further, time interval 510, referenced as T, may separate when one image was captured and when a next image in time was captured in the plurality of images. The time interval between images may span, for example, days, weeks, months, or years. While the time interval 510 is shown as being the same between the different pairs of images, it would be understood that this time interval may be different between different pairs of images.

Further, the time intervals between the different pairs of images may affect the temporal pattern of change associated with the three successive images. For example, if the three successive images are of a construction site for a building, and the time interval is a month, then the three successive images captured of the construction site may change significantly over each time interval as the building is being built and the area might not be deemed to have any persistent changes but rather an ongoing change. On the other hand, if the time interval is longer period of time such as years, then a change may be more likely to be identified as a persistent change. Taking the example of construction of a building again, three successive images of the construction site may not change much if the time interval is over years after the building is built. The area might indicate a persistent change.

In this regard, the time interval T may also be a variable indicative of finding presence or absence of a given temporal pattern of change in images. In one example, the time interval may be predefined and the image data analysis platform may request the images from the image data source based on this predefined time interval. In turn, the image data source may provide successive images where the time interval separates the capture of one image from another. In another example, a user may identify the time interval. The user may provide this identification via the user interface of the client station. In turn, the client station may provide this indication of the time interval to the image data analysis platform and the image data analysis platform may include the time interval in the request for images sent to the image data source. The image data source may then provide successive images where the specified time interval separates the capture of one image from another.

The time interval specified by the user may be based on the time interval at which images are captured. In some examples, the time interval specified by the user must be greater than or equal to the time interval at which images are captured. In other examples, the time interval can be less than the time interval at which images are captured if an image captured at the specified time interval is estimated. To illustrate, an image captured at day 10 and day 20 may be estimated by averaging images captured at day 5 and day 15, and day 15 and day 20, respectively. This way images captured at certain times may be estimated even though the image was not actually captured at that time.

Referring back to FIG. 3, at block 304, the image data analysis platform may compare the reference image to the target image to detect any changes between those two images for the area of interest. In practice, the image data analysis platform may evaluate the images at a pixel level, a pixel block level, or some other subdivision of the area. For instance, if the evaluation is being performed at the pixel block level, then the platform may compare each pixel block in the reference image to its complementary pixel block in the target image (i.e., the pixel blocks representing the same sector of the area of interest) and thereby determine a first likelihood of change between each pair of the complementary pixel blocks at the different times.

In one example, the first likelihood of change may be represented as a probability value ranging from a minimum value of 0% to a maximum value of 100%, where a probability value closer to 0% indicates that there is a low likelihood of there being a change between the pair of complementary pixel blocks in the reference and target images and a probability value that is closer to 100% indicates that there is a high likelihood of there being a change between the pair of complementary pixel blocks in the reference and target images. Based on this comparison, the platform may generate an array of probability values that indicate a likelihood of change between the reference and target images for each respective sector of the given area.

Turning to block 306, the image data analysis platform may compare the reference image to the target-plus-one image to detect any changes between those two images. As above, the platform may perform this evaluation at a pixel level, a pixel block level, or based on some other subdivision of the area. For instance, if the evaluation is being performed at a pixel block level, the platform may compare each pixel block in the reference image to its complementary pixel block in the target-plus-one image (i.e., the pixel blocks representing the same sector of the area) and thereby determine a second likelihood of change (e.g., a probability value) between the reference and target-plus-one images for each respective sector of the area. Then at block 308, the image data analysis platform may compare the target image to the target-plus-one image to detect a likelihood of change between those two images. As above, the platform may perform this evaluation at a pixel level, a pixel block level, or based on some other subdivision of the area. For instance, if the evaluation is being performed at a pixel block level, the platform may compare each pixel block in the target image to its complementary pixel block in the target-plus-one image (i.e., the pixel blocks representing the same sector of the given area) and thereby determine a third likelihood of change (e.g., a probability value) between the target and target-plus-one images for each respective sector of the given area.

Various statistical techniques may be used to perform these pairwise comparisons between images to detect changes, one example of which is an iteratively reweighted multivariate alteration detection process (IR-MAD). IR-MAD is an example change detection process which outputs an indication of whether a change exists or no change exists for a sector. The image data analysis platform may use other statistical techniques.

At block 310, after carrying out the three steps described above for each sector of the image, the image data analysis platform may then evaluate the results to of the three pairwise comparisons to identify one or more temporal patterns of change in the given area. This evaluation may take various forms.

In one implementation, the image data analysis platform may be configured to compare the respective likelihood of change values output by each of the three pairwise comparisons to a respective threshold value, and then identify whether any sub-area of the given area exhibits the temporal pattern of change based on the results of these three threshold comparisons.

For instance, the image data analysis platform may compare the first likelihood of change value for each respective sector of the given area to a first threshold level to determine whether there has been a meaningful change between the between the reference and target images in each sector. Based on this comparison, the image data analysis platform may determine that there has been a change between the reference and target images in a given sector if the likelihood of change value for a given sector exceeds the first threshold level. On the other hand, if the first likelihood of change value for the given sector does not exceed the first threshold level, then the image data analysis platform may determine that there has been no change between the reference and target image in the given sector (or at least that it is inconclusive as to whether there has been a change in the given sector).

The image data analysis platform may store the determination of change, no change for the pair of complementary pixel blocks associated with the reference image and target image in a change array which may take the form of a one dimensional or multi-dimensional array.

Tables 1-3 below show a simplified illustration of an example change array for example image data taking the form of a two-dimensional array. Tables 1-2 illustrate image data for the reference image and target images that has been sub-divided into a plurality of pixel blocks labeled from A to F. For example, pixel block A in the reference image and target image may be a complementary pair of pixel blocks which correspond to a same sector. In turn, Table 3 illustrates an example change array that correspond to the respective pixel blocks illustrated in Tables 1 and 2. For example, the pixel blocks labeled B and F associated with the reference image and the target image may be associated with no change for the illustrated reference and target image while the pixel blocks labeled A, C-E, and G-I may be labeled as change. The change array may be organized in various ways as well including storing the actual likelihood of change value, as indicated above, in addition or instead of simply an indication of change or no change.

TABLE 1

| Reference Image | | |
|---|---|---|
| A | B | C |
| D | E | F |
| G | H | I |

TABLE 2

| Target Image | | |
|---|---|---|
| A | B | C |
| D | E | F |
| G | H | I |

TABLE 3

| Change Array | | |
|---|---|---|
| Change | No Change | Change |
| Change | Change | No Change |
| Change | Change | Change |

Next, the platform may compare the second likelihood of change value for each respective sector of the area to a second threshold level (which might be the same or different from the first threshold level) to determine whether there has been a meaningful change between the reference and target-plus-one images in each sector. Based on this comparison, the image data analysis platform may determine that there has been a change between the reference and target-plus-one images in a given sector if the second likelihood of change value for a given sector exceeds the second threshold level. On the other hand, if the second likelihood of change value does not exceed the second threshold level, the image data analysis platform may determine that there has been no change between the reference and target-plus-one images in the given sector (or at least that it is inconclusive as to whether there has been a change in the given sector). The determination of change may be stored in a change array associated with the reference image and target-plus-one image.

Lastly, the image data analysis platform may compare the third likelihood of change value for each respective sector of the given area to a third threshold level (which may be the same or different from the first and/or second threshold levels) to determine whether there has been a meaningful change between the between the target and target-plus-one images in the given sector. Based on this comparison, the image data analysis platform may determine that there has been a change between the target and target-plus-one images in a given sector if the third likelihood of change value exceeds the third threshold level. On the other hand, the image data analysis platform may determine that there has been no change (i.e., that there is an absence of change) between the target and target-plus-one images in the given sector if the third likelihood of change value for the given sector does not exceed the third threshold level. The determination of change may be stored in a change array associated with the target image and target-plus-one image.

In some cases, the image data analysis platform may determine a likelihood of absence of change value between pixel blocks rather than a likelihood of change value. In this case, a likelihood of absence of change value exceeding a threshold level may be indicative of absence of change between a pair of complementary pixel blocks, i.e., "no change," and the likelihood of absence of change value falling below the threshold level may be indicative of a change, i.e., "change." This likelihood of absence of change determination could be applied at block 304, block 306, and/or block 308 rather than a likelihood of change determination. Then, the likelihood of absence of change value falling below a threshold would be indicative of a change for the pair of complementary pixel blocks.

In turn, the image data platform may evaluate the results of these threshold comparisons to identify a particular temporal pattern of change in the given area. For example, an identification of persistent changes, reverting changes, and/or ongoing changes, among others, may be made based on the change arrays, which indicate a change or no change between the reference and target images, reference and target-plus-one images, and target and target-plus-one change images.

Table 4 shows how the determination of change or no change between images may be used to determine whether a persistent or non-persistent change exists in the given area associated with the images.

TABLE 4

| Row | Reference & Target | Reference & Target + 1 | Target & Target + 1 | Decision |
|---|---|---|---|---|
| 1 | Change | Change | No Change | Persistent Change |
| 2 | Change | No Change | Change | Reverting Change |
| 3 | Change | Change | Change | Ongoing Change |
| 4 | Change | No Change | No Change | Indeterminate |
| 5 | No Change | Change | Change | Late Change |
| 6 | No Change | Change | No Change | Gradual Change |
| 7 | No Change | No Change | Change | Indeterminate |
| 8 | No Change | No Change | No Change | Stable |

For example, in row 1, the image data analysis platform may identify a persistent change in the given area by identifying any sector of the given area corresponding to a pair of complementary pixel blocks that has (1) a first likelihood of change value between the reference and target images that exceeds the first threshold value (which indicates a change between the first and second instances of time), (2) a second likelihood of change value between the reference and target-plus-one images that exceeds the second threshold value (which indicates a change between the first and third instances of time), and (3) a third likelihood of change value between the target and target-plus-one images that falls below the third threshold value (which indicates the absence of a change between the second and third instances of time). Such a combination demonstrates that a persistent change occurred in the sector of the given area between the first and second instances of time and that the same change persisted between the second and third instances of time.

In another example, in row 2, the platform may identify a reverting change in the given area by identifying any sector of the given area (e.g., any set of complementary pixel blocks) that has (1) a first likelihood of change value between the reference and target images that exceeds the first threshold value (which indicates a change between the first and second instances of time), (2) a second likelihood of change value between the reference and target-plus-one images that falls below the second threshold value (which indicates an absence of change between the first and third instances of time), and (3) a third likelihood of change value between the target and target-plus-one images that exceeds the third threshold value (which indicates a change between the second and third instances of time). Such a combination demonstrates that there was a change in the sector of the given area between the first and second instances of time but that the sector reverted back to its initial state between the second and third instances of time, thereby indicating a reverting change.

As yet another example, in row 3, the image data platform may identify an ongoing change in the given area by identifying any sector of the given area (e.g., any set of complementary pixel blocks) that has (1) a first likelihood of change value between the reference and target images that exceeds the first threshold value (which indicates a change between the first and second instances of time), (2) a second likelihood of change value between the reference and target-plus-one images that exceeds the second threshold value (which indicates a change between the first and third instances of time), and (3) a third likelihood of change value between the target and target-plus-one images that exceeds the third threshold value (which indicates a change between the second and third instances of time). Such a combination demonstrates that there was a change in the sector of the given area between the first and second instances of time and then another change in the sector between the second and third instances of time, thereby indicating an ongoing change.

Rows 4 to 8 show other temporal patterns of changes that may be useful to identify in the given area. Row 4 demonstrates that there was a change in the sector of the given area between the first and second instances of time, no change in the sector between the first and third instances of time, and no change in the sector between the second and third instances of time which indicates an indeterminate type of change. Row 5 demonstrates that there was no change in the sector of the given area between the first and second instances of time, a change in the sector between the first and third instances of time, and a change in the sector between the second and third instances of time which indicates a change solely between the time of the target image and the time of the target+1 image. Row 6 demonstrates that there was no change in the sector of the given area between the first and second instances of time, a change in the sector between the first and third instances of time, and no change in the sector between the second and third instances of time which indicates a gradual change. Row 7 demonstrates that there was no change in the sector of the given area between the first and second instances of time, no change in the sector between the first and third instances of time, and a change in the sector between the second and third instances of time which indicates another indeterminate type of change. Row 8 demonstrates that there was no change in the sector of the given area between the first and second instances of time, no change in the sector between the first and third instances of time, and no change in the sector between the second and third instances of time which indicates a stable environment (i.e., no change over the time instances). Other variations are also possible.

Other implementations for evaluating the results of the three pairwise comparisons to identify a temporal patterns of change in the given area exist as well. For instance, instead of comparing the respective outputs of the pairwise comparison to respective thresholds and then identifying a temporal patterns of change based on the results of those threshold comparisons, the platform may be configured to aggregate the respective outputs of the pairwise comparisons together into an aggregated value (e.g., by multiplying the outputs together) and then comparing the aggregated value to a single threshold value. In this respect, the manner in which the respective outputs of the pairwise comparisons are aggregated together is dictated by the temporal pattern of change that the platform is attempting to identify. For example, if the platform is attempting to identify a persistent change, the platform may multiply the first likelihood value, the second likelihood value, and the complement of the third likelihood value (such that the value is represented in terms of absence of change). As another example, if the platform is attempting to identify an ongoing change, the platform may multiply the first likelihood value, the second likelihood value, and the third likelihood value. As yet another example, if the platform is attempting to identify a reverting change, the platform may multiply the first likelihood value, the complement of the second likelihood value (such that the value is represented in terms of absence of change), and the third likelihood value. Other implementations are possible as well.

The process described above is just one example of how the image data analysis platform may determine the one or more temporal patterns of change for a reference image, target image, and target-plus-one image. In the described example, the determination of change is performed for each pair of complementary pixel blocks in the reference image and target image, then for each pair of complementary pixel blocks in the reference image and target-plus-one image, and then for each pair of complementary pixel blocks in the target image and target-plus-one image. After each pair of complementary pixel blocks is processed in each image, one or more temporal patterns of change are determined for the images. However, in other examples, the processing may be different.

In one example, operations associated with block 304, block 306, and block 308 may not be necessarily performed the described order. For instance, operations associated with block 306 or 308 may be performed before operations associated with block 304. Alternatively, operations associated with block 308 may be performed after operations associated with block 304 and instead of operations associated with block 306 or in parallel.

In a second example, the determination of change can be performed for a pair complementary pixel blocks in the reference image and target image for a given sector, the pair of complementary pixel blocks in the reference image and target-plus-one image for the same given sector, and the pair of complementary pixel blocks in the target image and target-plus-one image again for the same sector. Then, the one or more temporal patterns of change are determined for that sector and this process may be repeated for another sector until all sectors in the area are processed. This process differs from that described in FIG. 3 where the determination of change is performed for each pair of complementary pixel blocks in the reference image and target image, then the determination of change is performed for each pair of complementary pair of pixel blocks in the reference image and target-plus-one image, and then the determination of change is performed each pair of complementary pair of pixel blocks in the target image and target plus one image. After each pixel block in each image is processed, the one or more temporal patterns of change may be determined for the given area.

Figure 6:
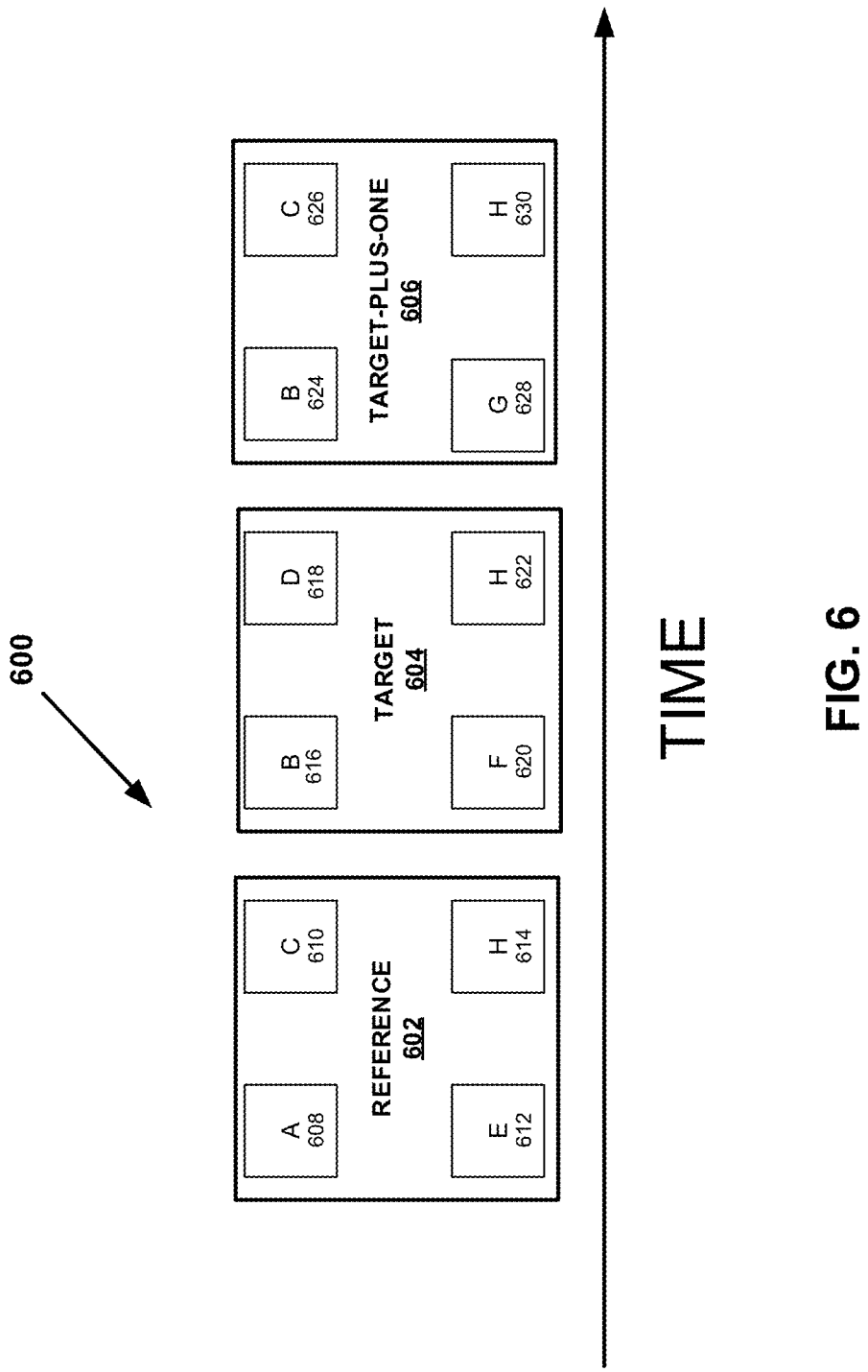
FIG. 6 shows an example set of images including a reference image, target image, and target-plus-one image having pixel blocks.

FIG. 6 illustrates how changes in a pixel block over the reference image, target image, and target-plus-one image can impact a determination of the temporal patterns of change in the images in accordance with the described process. A set of images 600 may include a reference image 602, target image 604, and target-plus-one image 606 having pixel blocks 608-630. In this example, pixel blocks shown in a same location in each of the images may correspond to pixel blocks in a same sector. For instance, pixel blocks 608 and 616 correspond to a same sector. Further, in this example, the pixel blocks may be labeled with a letter such that pixel blocks with the same letter may be pixel blocks which have same image data.

The disclosed process may identify a persistent change when there is a change between the pair of complementary pixel blocks corresponding to a given sector in a reference image and target image changes, there is a change between the pair of complementary pixel blocks corresponding to the same given sector in the reference image and target-plus-one image, and there is an absence of change between the pair of complementary pixel blocks corresponding to the same given sector in the target image and target-plus-one image. The pixel blocks in the upper left corner of the set of images 600 illustrates this example. The set of images 600 show that the pixel block 608 in the reference image 602 and the pixel block 616 target image 604 are different because the pixel blocks have different labels (i.e., A and B, respectively), the pixel block 608 in the reference image 602 and the pixel block 624 target-plus-one image 604 are different because the pixel blocks have different labels (i.e., A and B, respectively), and the pixel block 616 in the target image 604 and the pixel block 624 target-plus-one image 606 are the same because the pixel blocks have the same labels (i.e., B and B, respectively). The pixel blocks may indicate a persistent change in the sector.

A real-world example of such a persistent change may be a boundary of roadway which is built. The reference image may describe the land before the road is built, the target image may describe the land after the road is built, and the target-plus-one image may describe the land several years later after the road is built. The pixel blocks associated with the road once built may not change over time, indicating a persistent change.

As another example, the disclosed process may identify a reverting change when a pair of complementary pixel blocks for a given sector in a reference image and target image changes and the pair of complementary pixel blocks for the same given sector in the target-plus-one image reverts to what was in the reference image. The pixel blocks in the upper right corner of the images illustrates this example. The set of images 600 show that the pixel block 610 in the reference image 602 and the pixel block 618 target image 604 are different because the pixel blocks have different labels (i.e., C and D, respectively), the pixel block 610 in the reference image 602 and the pixel block 626 target-plus-one image 604 are the same because the pixel blocks have the same labels (i.e., C and C, respectively), and the pixel block 618 in the target image 604 is different from the pixel block 626 in the target-plus-one image (i.e., D and C, respectively). The pixel blocks may indicate the temporal pattern of change in the sector as a reversion.

A real-world example of such an area may be land where the reference image may describe the land before vegetation is cleared from the land, the target image may describe the land after vegetation is cleared and the target-plus-one image may describe the land several years later after the land is abandoned such that the vegetation grows back. Pixel blocks associated with the area may be indicative of a non-persistent change.

As yet another example, the disclosed process may identify an ongoing change when the pair of complementary pixel blocks for a given sector in the reference image and target image changes and the pair of complementary pixel blocks for the same given sector in the target image and target-plus-one image changes again. The pixel blocks in the lower left corner of the images illustrates this example. The set of images 600 show that the pixel block 612 in the reference image 602 and the pixel block 620 target image 604 are different because the pixel blocks have different labels (i.e., E and F, respectively), the pixel block 612 in the reference image 602 and the pixel block 628 target-plus-one image 604 are different (i.e., E and G, respectively), and the pixel block 620 in the target image 604 and the pixel block 628 target-plus-one image 604 are different (i.e., F and G, respectively). The pixel blocks may indicate the temporal pattern of change in the sector as an ongoing change.

A real-world example of such an area may be a parking spot in a parking lot. A change may be indicated if the parking spot is empty in the reference image, a truck is parked in the parking spot in the target image, but a boat is parked in the parking spot in the target image plus one image. When the pixel block is associated with the parking spot, the change is not persistent because two different vehicles were in the parking spot over the time when the three images were captured.

In another example, the disclosed process may identify no change for a given sector when there is no change detected in the comparisons of the pixel blocks for the given sector between any of the reference image, target image, and target-plus-one image. The pixel blocks in the lower right corner of the images illustrates this example. The set of images 600 show that the pixel block 614 in the reference image 602 and the pixel block 622 target image 604 are the same because the pixel blocks have the same labels (i.e., H and H, respectively), the pixel block 612 in the reference image 602 and the pixel block 630 target-plus-one image 604 are the same (i.e., H and H, respectively), and the pixel block 622 in the target image 604 and the pixel block 630 target-plus-one image 604 are the same (i.e., H and H, respectively). A real world example of such an area may be a remote desert such that at any instant characteristics remain the same.

A determination of one or more temporal patterns of change at different times may be used to determine activity in a given area. For instance, new infrastructure such as a building may be detected as an ongoing change as the building is built followed by a persistent change once the building is complete. Other uses combining temporal patterns of change at different times in the given area to determine activity are also possible.

The above real-world examples generally illustrate determination of temporal patterns of change in a land context. However, the disclosed process could be used in other contexts as well. A security context might be one example of such a context. To illustrate, the disclosed process may be used to identify whether objects in a field of view do not move. Consider a surveillance camera which captures a plurality of images of a train platform. A first image may show no bag on the platform at 8 pm. A second image may show a bag on the platform at 9 pm. A third image may show that same bag on the platform at 11 pm. The absence and then presence of the bag in a sector may be identified as a persistent change, and a possible security issue because the bag appears to be abandoned.

At block 312, after analyzing the successive images of the given area to identify one or more temporal patterns of change, the platform may then generate output data indicating the patterns of change in the given area. This output data may take various forms.

The image data analysis platform may generate for a set of images an array of indicators where each indicator in the array corresponds to a respective sector of the given area and indicates whether a particular temporal pattern of change has been identified in that sector. The indicators themselves might take various forms. As one example, the indicator corresponding to each respective sector may take the form of a binary one or zero value, where a one value indicates a presence of a particular temporal pattern of change in the respective sector and a zero value indicates absence of that pattern of change in the respective sector (or vice versa). Table 5 is an example of such an array for indicating persistent changes in a given area, which corresponds to the example image shown in Tables 1 and 2 composed of nine pixel blocks.

TABLE 5

| A | B | C |
|---|---|---|
| Persistent Change | Persistent Change | Persistent Change |
| 1 | 1 | 1 |
| D | E | F |
| Persistent Change | No Persistent Change | Persistent Change |
| 1 | 0 | 1 |
| G | H | I |
| Persistent Change | Persistent Change | Persistent Change |
| 1 | 1 | 1 |

Table 5 shows that the sectors A-D and F-I associated with reference image, target image, and target-plus-one images are identified as persistent changes and labeled with a binary "1." On the other hand, the sector E may be identified as absence of persistent change and labeled with a binary "0." In this regard, sectors A-D, and F-I in the given area may have a persistent change and sector E may have some other temporal pattern of change.

As another example, the indicator corresponding to each respective sector may take the form of a probability value (which may also be referred to herein as a "confidence level") ranging from 0 to 100%, where a value closer to 0% indicates that the particular temporal pattern of change is less likely to have occurred at the given sector and a value closer to 100% indicates that a persistent change is more likely to have occurred at the given sector. In practice, this confidence level may be determined based on the probability values discussed above. For instance, if a given sector exhibits a likelihood of change between the reference and target images that comfortably exceeds the first threshold, a likelihood of change between the reference and target-plus-one images that comfortably exceeds the second threshold, and a likelihood of change between the target and target-plus-one images that comfortably falls below the third threshold, the data platform may have a higher confidence level in its determination that the given sector exhibits a persistent change. On the other hand, if a given sector exhibits a likelihood of change between the reference and target images that barely exceeds the first threshold, a likelihood of change between the reference and target-plus-one images that barely exceeds the second threshold, and a likelihood of change between the target and target-plus-one images that barely falls below the third threshold, the data platform may have a lower confidence level in its determination that the given sector exhibits a persistent change.

Whether the likelihood of change value "comfortably" exceeds or "barely" exceeds" the threshold may be based on comparing a difference, e.g., absolute value of the difference, of the likelihood of change value and the threshold to yet another threshold. If the difference exceeds this threshold, then the likelihood of change value may comfortably exceed the respective first, second, or third threshold. If the difference does not exceed this threshold, then the likelihood of change value may barely exceed the respective first, second, or third threshold. In turn, this determination may be used to define the confidence level.

In another implementation, the output data indicating where the temporal patterns of change have been identified in the given area may include location data for each sub-area of the given area that exhibits the particular pattern of change, where the sub-area may be an individual sector or a broader region that encompasses multiple sectors. In this respect, the platform may perform a further analysis of the data identifying the sectors where the temporal pattern of change has been identified to identify broader regions in the given area where there is are "clusters" of such sectors. For example, the platform may look at a set of sectors in a broader region of the given area (e.g., sectors within a given distance of one another) to determine the extent of sectors within that region that exhibit a particular temporal pattern of change. If the determined extent exceeds a threshold (e.g., a percentage of sectors in the region exceed a threshold percentage, a number of sectors in the region exceed a threshold total number, etc.), the platform may determine that the broader region exhibits that temporal pattern of change and then generate location data for that broader region, which may be included in the output data for the given area.

After identifying one or more sub-areas in the given area that exhibit a temporal pattern of change, the data platform may take various actions.

In one example, the data platform may cause the client station in the network arrangement to display a visual representation of the one or more sectors (or regions) in the given area that exhibit the temporal pattern of change. For example, the visual representation may take the form of a map of the given area that includes indicators of the one or more sectors that exhibit a persistent change, an ongoing change, and/or a reverting change.

Figure 7:
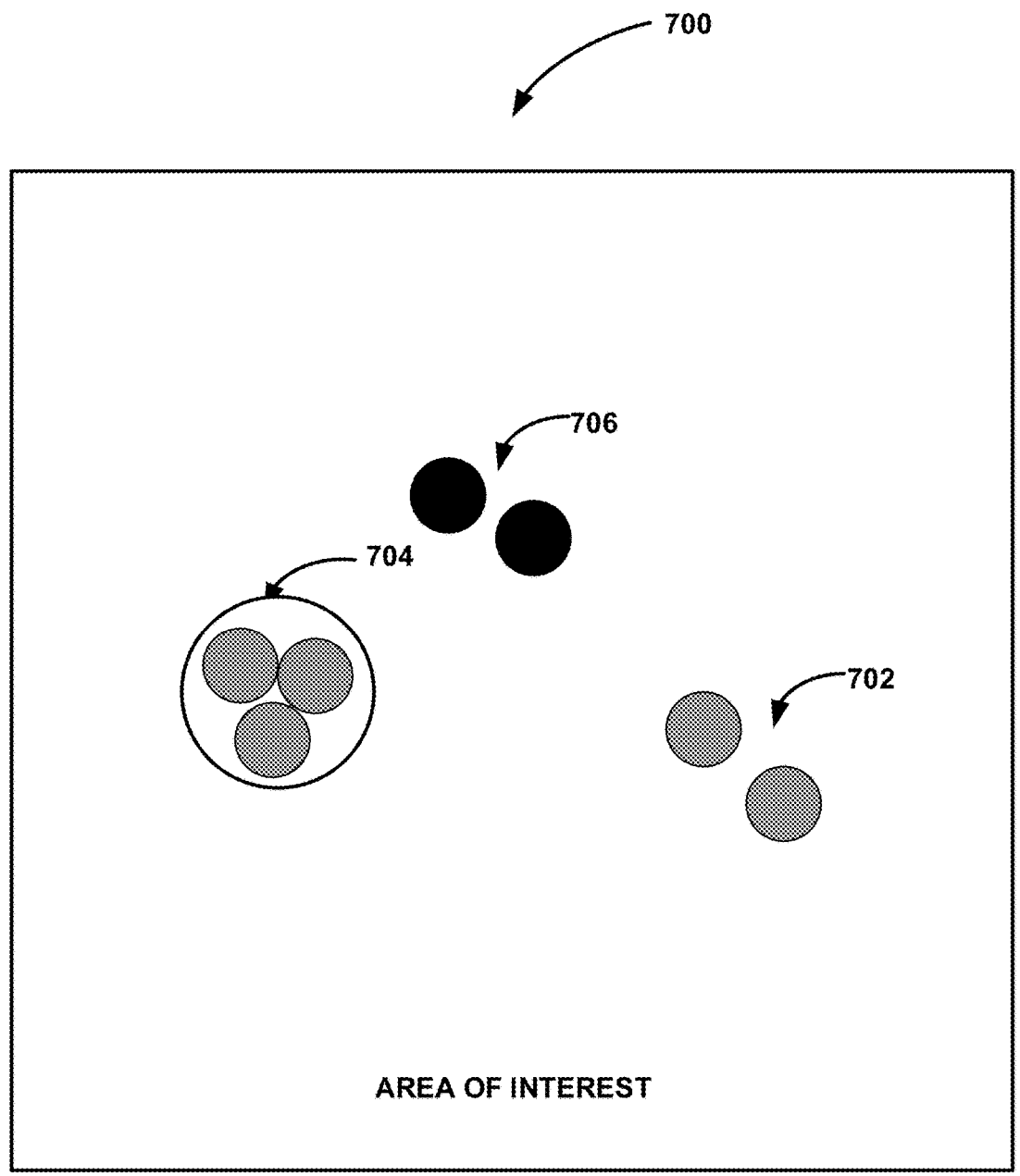
FIG. 7 shows an example map for an area of interest.

FIG. 7 shows an example map 700 for the area of interest where the pixel blocks take the form of circles rather than rectangles as described above. The map 700 may be arranged to indicate a temporal pattern of change. For example, sectors associated with persistent changes 702 may be illustrated with a light grey level. Additionally, sectors adjacent to each other geographically may be combined together, e.g., clustered, to form a region 704 associated with a persistent change. Other arrangements are also possible.

In addition to the indicators of the one or more sectors that exhibit one temporal pattern of change (e.g., a persistent change), the map could also optionally include indicators of other temporal patterns of changes (e.g., reverting and/or ongoing changes) identified by the image data analysis platform. For example, sectors associated with temporal patterns of change (e.g., reverting and/or ongoing changes) 706 may be illustrated with a dark grey level, or vice versa. Additionally, or alternatively, different colors may be used to identify the different types of changes on the map. To illustrate, pixels associated with one temporal patterns of change may be shown as one color, while pixels associated with other changes may be shown as another color. Other variations are also possible.

In some examples, the visual representation may also include a reflection of the image data analysis platform's confidence level in its identification of each sector that exhibits a particular temporal pattern of change. For example, if the visual representation takes the form of a map as described above, the size, color, and/or transparency level of the indicator for a given sector may reflect the image data analysis platform's confidence level in its determination that the given sector exhibits the particular temporal pattern of change.

Additionally, or alternatively, the image data analysis platform may provide a notification to the client station when a particular temporal pattern of change is detected. The notification may take the form of a message such as an email or text message or audible indication that is presented on the client station, e.g., in a web browser, to indicate that the temporal pattern of change has been detected in a sector or area. The notification may also identify a geocode or some other indication where the persistent change was detected.

The image data analysis platform may also be arranged to determine the temporal pattern of change over a period of time that spans more than the time between when a reference image is captured and when a target-plus-one image is captured. In other words, it may be desirable to monitor temporal patterns of change over time by monitoring change over more than three images of the area of interest.

The disclosed system may use a sliding window to facilitate this monitoring. The sliding window may define a duration of time. The duration may be defined by a start time and an end time. Those images of the given area captured over the duration of time which fall within the start time and the end time of the sliding window may define a first set of images for which persistent change is to be determined. The particular temporal pattern of change is determined for this first set. Then, the sliding window may moved so that the start time and end time changes and a second set of images falls within the window. The second set of images may include images which include or do not include some images in the first set, e.g., the images may overlap or not overlap with the images in the first set. The temporal pattern of change is determined for this second set. This process is repeated over a plurality of images to determine how the temporal patterns of change vary over the images and corresponding area.

Figure 8:
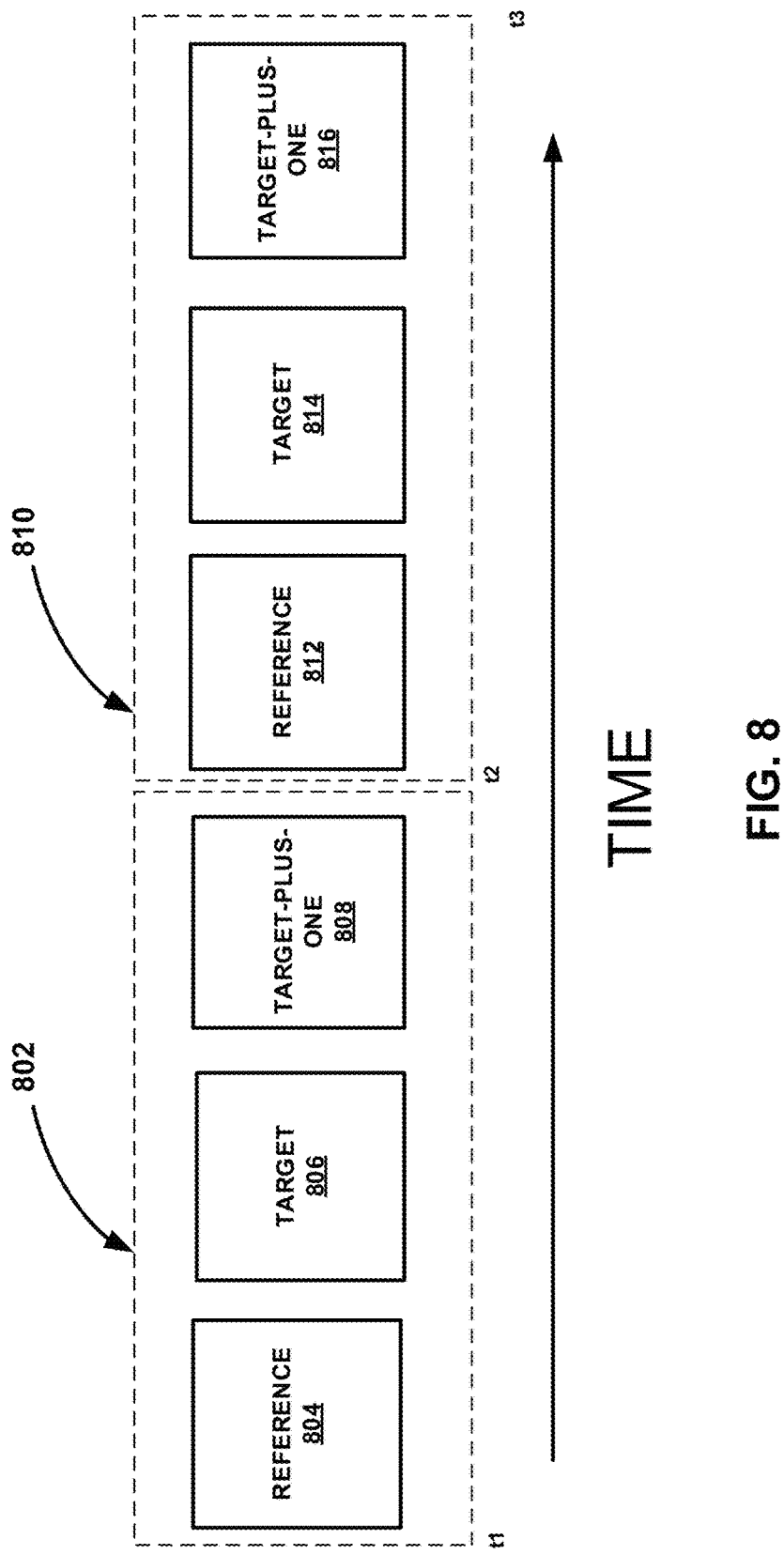
FIG. 8 illustrates use of a sliding window to facilitate monitoring of a temporal patterns of change.

FIG. 8 illustrates the use of the sliding window via sliding windows 802 and 810. The sliding window 802 may define a time range from a start time t1 to an end time t2. Images 804, 806, 808 may fall within the sliding window 802 between t1 and t2. The image data analysis platform may determine the temporal patterns of change in the area based on the successive images in the sliding window 802. Then, the sliding window 802 may then be moved to 810 so that it defines a time range from a start time t2 to an end time t3. Another set of three successive images 812, 814, 816 may fall within the window 810 between t2 and t3. The images in the set at t1 to t2 do not overlap with the images in the set at t2 to t3 in this example, but in other examples the images could overlap such that sliding window 802 and 810 share one or more images. For example, a first window may have a reference, target, and target-plus-one image and in a second window the target becomes reference, the target-plus-one becomes target, and a new image becomes target-plus-one image.

In the sliding window 810, the image data analysis platform may determine the temporal pattern of change in the area based on the successive images in the sliding window 810. The window may be slid again and this process repeated for additional sets of images. In this regard, the image data analysis platform may determine the temporal pattern of change for each set of images which fall in a respective sliding window. The client station might also output a visualization illustrative of how sectors in the area of interest may have or not have a persistent change at the different time intervals, e.g., T1-T2, T2-T3 etc. The visualization may be in the form of one or more maps which dynamically show how areas associated with persistent changes may vary over time.

Application of the sliding window may involve forming a new set of images by removing one or more captured images in a window and adding one or more captured images previously not in the window to form the new set of images. The image removed may be an earliest captured image or images in the window. However, in other embodiments, images other than an earliest captured image or images may be removed. For example, the temporal pattern of change may be determined for a first set of images which comprises a reference, target, and target-plus-one image. Then, the temporal pattern of change may be determined for a second set of images where one or more of the reference image and target in the first set may be the same as in the second set and the target image may be updated with a new image which was not in the first set. This process may continue by updating the target image at different time intervals. Other variations are also possible.

Further, the disclosed process may not be necessarily limited to determining the temporal pattern of change in a set of three images. The temporal pattern of change could be determined for sets of images greater than three. For example, various combinations of two or more images in a set of four or more images may be analyzed to detect change or no change in the set of four or more images. The indication of change or no change may then be used to determine whether the associated area has a persistent change. Alternatively, an image in a set of images may actually be a plurality of images combined together to form a single image. For example, the plurality of images may be combined into the single image by averaging the pixels in the plurality of images. Each pixel in each image might also be further weighed depending on a difference in time between when one image is captured and another image is captured in the plurality of images. The single image may represent one of the reference, target, or target-plus-one image.

In some cases, the temporal pattern of change may be determined in areas where assets such as transportation machines (e.g., locomotives, aircrafts, passenger vehicles, semi-trailer trucks, ships, etc.), industrial machines (e.g., mining equipment, construction equipment, manufacturing equipment, processing equipment, assembly equipment, etc.), and unmanned aerial vehicles, among other examples, operate. The disclosed image data source may collect and store data related to the assets such as a location of the asset ("location data") to determine the area where the assets operate. To facilitate this process, the asset may have sensors configured to measure physical properties such as the location and/or movement of the asset, in which case the sensors may take the form of GNSS sensors, dead-reckoning-based sensors, accelerometers, gyroscopes, pedometers, magnetometers, or the like. Further, the asset may be generally configured to facilitate determining its location/position and/or track its movements via one or more positioning technologies, such as a GNSS technology (e.g., GPS, GLONASS, Galileo, BeiDou, or the like), triangulation technology, and the like.

The asset may provide to the image data analysis platform and/or image data source the location data that indicates the position of the asset, which may take the form of GPS coordinates, among other forms. In some implementations, the asset may provide to the image data analysis platform the location data continuously, periodically, based on triggers, or in some other manner. The image data analysis platform may use the location data of an asset to identify where the temporal pattern of change is to be determined. For example, the client station may display on the display screen an indication of various assets and/or its location. Each asset and/or its location may be a possible area of interest for which the temporal pattern of change is to be determined. The client station may receive an indication via a user input that a particular asset is selected. Selection of the particular asset may cause the location data for the asset to be provided to the image data source via the image data analysis platform which in turn causes the image data source to provide images associated with where the asset is located, e.g., an area of interest, to the image data analysis platform. The image data analysis platform may then use these images to determine the temporal pattern of change in the area of interest.

Further, a temporal pattern of changes (persistent change, ongoing change, reverting change) may not only exist in images. The temporal pattern of change may exist in other contexts. For example, in a financial context, stock price or asset valuations may be analyzed over instances of time to determine how financial data changes over time. For example, if the stock price or asset valuation fluctuates over short periods of time but continues to grow in value over time, then the stock price or asset valuation may have an ongoing change indicative of this growth. But if the stock price or asset valuation fluctuates over short periods of time but does not grow in value over time, then the stock price or asset valuation may have a reverting change. As another example, a patterns of change analogous to the temporal patterns of change discussed herein may be determined for spatial data in or more dimensions, such as a reverting change from desert to rain forest and back to desert along a particular path. In general, the patterns of change may be determined in accordance with the described process for data in domains including one or more of a time domain and/or spatial domain. Variations are also possible.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided may not be the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

To the extent that examples described herein involve operations performed or initiated by actors, such as "humans," "operators," "users," or other entities, this is for purposes of example and explanation only. Also, to the extent that reference is made to "first time," "second time," time "t1," time "t2," etc. and unless otherwise noted, the first time and second time may denote a temporal order, but the terms "first," "second," "1," 2" etc. themselves are not otherwise intended to denote any particular order. Moreover, the claims should not be construed as requiring action by such actors unless explicitly recited in the claim language.

The invention claimed is:

1. A method comprising:
receiving, at a computing system configured to perform image-data analysis, a set of successive images for a given area from an image data source via a communication network, wherein the set of successive images comprises a first image captured at a first time, a second image captured at a second time, and third image captured at a third time, wherein the given area comprises a plurality of sectors, and wherein each image in the set of successive images is defined by a respective set of image data;

for each respective sector of the plurality of sectors of the given area:
  performing, by the computing system, a first image-data analysis of the first and second images that involves (i) comparing a respective portion of the first image that corresponds to the respective sector with a respective portion of the second image that corresponds to the respective sector and (ii) based on the comparing, determining a first likelihood of change between the respective portion of the first image that corresponds to the respective sector and the respective portion of the second image that corresponds to the respective sector;
  performing, by the computing system, a second image-data analysis of the first and third images that involves (i) comparing the respective portion of the first image that corresponds to the respective sector with a respective portion of the third image that corresponds to the respective sector and (ii) based on the comparing, determining a second likelihood of change between the respective portion of the first image that corresponds to the respective sector and the respective portion of the third image that corresponds to the respective sector;
  performing, by the computing system, a third image-data analysis of the second and third images that involves (i) comparing the respective portion of the second image that corresponds to the respective sector with the respective portion of the third image that corresponds to the respective sector and (ii) based on the comparing, determining a third likelihood of change between the respective portion of the second image that corresponds to the respective sector and the respective portion of the third image that corresponds to the respective sector; and
  evaluating the first, second, and third likelihood of change for the respective sector to classify the respective sector as exhibiting a given one of two or more different types of changes, wherein the evaluating comprises:
    comparing the first likelihood of change to a first threshold, the second likelihood of change to a second threshold, and the third likelihood of change to a third threshold; and
    classifying the respective sector as exhibiting a persistent type of change if the first likelihood of change exceeds the first threshold, the second likelihood of change exceeds the second threshold, and the third likelihood of change does not exceed the third threshold; and
  outputting, to a client station via the communication network, data indicating that at least one sector of the given area has been classified as exhibiting a persistent type of change.

2. The method of claim 1, wherein the evaluating further comprises:
  classifying the respective sector as exhibiting an ongoing type of change if the first likelihood of change exceeds the first threshold, the second likelihood of change exceeds the second threshold, and the third likelihood of change exceeds the third threshold.

3. The method of claim 1, wherein the evaluating further comprises:
  classifying the respective sector as exhibiting a reverting type of change if the first likelihood of change exceeds the first threshold, the second likelihood of change falls below the second threshold, and the third likelihood of change exceeds the third threshold.

4. The method of claim 1, wherein the respective set of image data defining each of the first image, the second image, and the third image is organized into pixel blocks that each correspond to a respective sector of the given area, and wherein for each respective sector of the given area:
  performing the first image-data analysis involves comparing the pixel block from the first image that corresponds to the respective sector to a complementary pixel block from the second image that corresponds to the respective sector and thereby determining the first likelihood of change for the respective sector,
  performing the second image-data analysis involves comparing the pixel block from the first image that corresponds to the respective sector to a complementary pixel block from the third image that corresponds to the respective sector and thereby determining the second likelihood of change for the respective sector, and
  performing the third image-data analysis involves comparing the pixel block from the second image that corresponds to the respective sector to the complementary pixel block from the third image that corresponds to the respective sector and thereby determining a first likelihood of change for the respective sector.

5. The method of claim 1, wherein the data indicating that at least one sector of the given area has been classified as exhibiting a persistent type of change comprises location data for the at least one sector.

6. The method of claim 1, wherein the data indicating that at least one sector of the given area has been classified as exhibiting a persistent type of change is included as part of an array of indicators that each correspond to a respective sector of the plurality of sectors of the given area, and wherein each indicator in the array of indicators provides an indication of whether the respective sector has been classified as exhibiting a persistent type of change.

7. The method of claim 1, further comprising:
  instructing the client station to display a map of the given area that includes a visual representation of the data indicating that at least one sector of the given area has been classified as exhibiting a persistent type of change.

8. The method of claim 1, further comprising:
  instructing the client station to display a map of the given area that includes a visual representation of the data indicating that a persistent type of change has occurred at the at least one sub-area of the given area.

9. A method comprising:
  receiving, at a computing system configured to perform image-data analysis, a set of successive images for a given area from an image data source via a communication network, wherein the set of successive images comprises a first image captured at a first time, a second image captured at a second time, and third image captured at a third time, wherein each image in the set of successive images is defined by a respective set of image data;
  performing, by the computing system, a first image-data analysis of the first image captured at the first time and the second image captured at the second time that involves (i) comparing the respective set of data defining the first image to the respective set of data defining the second image and (ii) based on the comparing, detecting any sub-area of the given area that exhibits a change between the first and second images;

performing, by the computing system, a second image-data analysis of the first image captured at the first time and the third image captured at the third time that involves (i) comparing the respective set of data defining the first image to the respective set of data defining the third image and (ii) based on the comparing, detecting any sub-area of the given area that exhibits a change between the first and third images;

performing, by the computing system, a third image-data analysis of the second image captured at the second time and the third image captured at the third time that involves (i) comparing the respective set of data defining the second image to the respective set of data defining the third image and (ii) based on the comparing, detecting any sub-area of the given area that exhibits an absence of change between the second and third images;

based on the first, second, and third image-data analyses, identifying at least one sub-area of the given area that exhibits a change between the first and second images, a change between the second and third images, and an absence of change between the second and third images;

classifying the at least one sub-area of the given area as a sub-area that exhibits a persistent type of change; and outputting, to a client station via the communication network, data indicating that a persistent type of change has occurred at the at least one sub-area of the given area.

10. The method of claim 9, further comprising:

before receiving the set of successive images for the given area from the image data source, (a) receiving, from the client station, a request to identify any sub-area of the given area that exhibits a persistent type of change and (b) in response to receiving the request from the client station, transmitting, to the image data source, a request for the set of successive images for the given area.

11. The method of claim 9, wherein:

detecting any sub-area of the given area that exhibits a change between the first and second images comprises, for each respective sub-area of a plurality of sub-areas of the given area, (a) determining a respective first likelihood of change between a respective portion of the first image that corresponds to the respective sub-area and a respective portion of the second image that corresponds to the respective sub-area and (b) determining whether the respective first likelihood of change exceeds a first threshold;

detecting any sub-area of the given area that exhibits a change between the first and third images comprises, for each respective sub-area of the plurality of sub-areas of the given area, (a) determining a respective second likelihood of change between the respective portion of the first image that corresponds to the respective sub-area and a respective portion of the third image that corresponds to the respective sub-area and (b) determining whether the respective second likelihood of change exceeds a second threshold; and detecting an absence of any change between the second and third images comprises, for each of the plurality of sub-areas of the given area, (a) determining a respective third likelihood of change between the respective portion of the second image that corresponds to the respective sub-area and the respective portion of the third image that corresponds to the respective sub-area and (b) determining whether the respective third likelihood of change falls below a third threshold.

12. The method of claim 11, wherein identifying the at least one sub-area of the given area that exhibits a change between the first and second images, a change between the second and third images, and an absence of change between the second and third images comprises identifying at least one sub-area having a respective first likelihood of change that exceeds the first threshold, a respective second likelihood of change that exceeds the second threshold, and a respective third likelihood of change that falls below the third threshold.

13. The method of claim 9, wherein the data indicating that a persistent type of change has occurred at the at least one sub-area of the given area comprises location data for the at least one sub-area.

14. The method of claim 9, wherein the data indicating that a persistent type of change has occurred at the at least one sub-area of the given area is included as part of an array of indicators that each correspond to a respective sub-area of the given area, and wherein each indicator in the array of indicators provides an indication of whether the respective sub-area has been classified as exhibiting a persistent type of change.

15. A computing system comprising:

a network interface configured to communicatively couple the computing system to (a) at least one image data source and (b) at least one client station;

at least one processor;

a non-transitory computer-readable medium; and program instructions stored on the non-transitory computer-readable medium that are executable by the at least one processor to cause the computing system to:

receive a set of successive images for a given area from an image data source via the network interface, wherein the set of successive images comprises a first image captured at a first time, a second image captured at a second time, and third image captured at a third time, wherein the given area comprises a plurality of sectors, and wherein each image in the set of successive images is defined by a respective set of image data;

for each respective sector of the given area:

perform a first image-data analysis of the first and second images that involves (i) comparing a respective portion of the first image that corresponds to the respective sector with a respective portion of the second image that corresponds to the respective sector and (ii) based on the comparing, determining a first likelihood of change between the first image that corresponds to the respective sector and the second image that corresponds to the respective sector;

perform a second image-data analysis of the first and third images that involves (i) comparing the respective portion of the first image that corresponds to the respective sector with a respective portion of the third image that corresponds to the respective sector and (ii) based on the comparing, determining a second likelihood of change between the respective portion of the first image that corresponds to the respective sector and the respective portion of the third image that corresponds to the respective sector;

perform a third image-data analysis of the second and third images that involves (i) comparing the respective portion of the second image that corresponds to the respective sector with the respective portion of the third image that corresponds to the respective sector and (ii) based on the comparing, determining a third likelihood of change between the respective portion of the second image that corresponds to the respective sector and the respective portion of the third image that corresponds to the respective sector;

evaluate the first, second, and third likelihood of change for the respective sector of the given area to classify the respective sector as exhibiting a given one of two or more different types of changes, wherein the evaluation comprises:

comparing the first likelihood of change to a first threshold, the second likelihood of change to a second threshold, and the third likelihood of change to a third threshold; and classifying the respective sector as exhibiting a persistent type of change if the first likelihood of change exceeds the first threshold, the second likelihood of change exceeds the second threshold, and the third likelihood of change does not exceed the third threshold; and output, to a client station via the network interface, data indicating that at least one sector of the given area has been classified as exhibiting a persistent type of change.

16. The computer system of claim 15, wherein the evaluation further comprises:

classifying the respective sector as exhibiting an ongoing type of change if the first likelihood of change exceeds the first threshold, the second likelihood of change exceeds the second threshold, and the third likelihood of change exceeds the third threshold.

17. The computer system of claim 15, wherein the evaluation further comprises:

classifying the respective sector as exhibiting a reverting type of change if the first likelihood of change exceeds the first threshold, the second likelihood of change falls below the second threshold, and the third likelihood of change exceeds the third threshold.

18. The computer system of claim 15, wherein the data indicating that at least one sector of the given area has been classified as exhibiting a persistent type of change is included as part of an array of indicators that each correspond to a respective sector of the plurality of sectors of the given area, and wherein each indicator in the array of indicators provides an indication of whether the respective sector has been classified as exhibiting a persistent type of change.

19. The computer system of claim 15, further comprising program instructions stored on the non-transitory computer-readable medium that are executable by the at least one processor to cause the computing system to:

instruct the client station to display a map of the given area that includes a visual representation of the data indicating that at least one sector of the given area has been classified as exhibiting a persistent type of change.

20. A computing system comprising:

a network interface configured to communicatively couple the computing system to (a) at least one image data source and (b) at least one client station;

at least one processor;

a non-transitory computer-readable medium; and program instructions stored on the non-transitory computer-readable medium that are executable by the at least one processor to cause the computing system to:

receive a set of successive images for a given area from an image data source via the network interface, wherein the set of successive images comprises a first image captured at a first time, a second image captured at a second time, and third image captured at a third time, wherein each image in the set of successive images is defined by a respective set of image data;

perform a first image-data analysis of the first image captured at the first time and the second image captured at the second time that involves (i) comparing the respective set of data defining the first image to the respective set of data defining the second image and (ii) based on the comparing, detecting any sub-area of the given area that exhibits a change between the first and second images;

perform a second image-data analysis of the first image captured at the first time and the third image captured at the third time that involves (i) comparing the respective set of data defining the first image to the respective set of data defining the third image and (ii) based on the comparing, detecting any sub-area of the given area that exhibits a change between the first and third images;

perform a third image-data analysis of the second image captured at the second time and the third image captured at the third time that involves (i) comparing the respective set of data defining the second image to the respective set of data defining the third image and (ii) based on the comparing, detecting any sub-area of the given area that exhibits an absence of change between the second and third images;

based on the first, second, and third image-data analyses, identify at least one sub-area of the given area that exhibits a change between the first and second images, a change between the second and third images, and an absence of change between the second and third images;

classify the at least one sub-area of the given area as a sub-area that exhibits a persistent type of change; and output, to a client station via the network interface, data indicating that a persistent type of change has occurred at the at least one sub-area of the given area.

* * * * *